United States Patent
Siddiqi et al.

(10) Patent No.: US 11,770,716 B2
(45) Date of Patent: Sep. 26, 2023

(54) SEARCH-BASED HEURISTIC FOR FIXED SPECTRUM FREQUENCY ASSIGNMENT

(71) Applicant: King Fahd University of Petroleum and Minerals, Dhahran (SA)

(72) Inventors: Umair F. Siddiqi, Dhahran (SA); Sadiq M. Sait, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 38 days.

(21) Appl. No.: 16/407,907

(22) Filed: May 9, 2019

(65) Prior Publication Data

US 2020/0359227 A1    Nov. 12, 2020

(51) Int. Cl.
    *H04W 16/12*    (2009.01)
    *H04L 27/26*    (2006.01)
    *H04B 1/715*    (2011.01)

(52) U.S. Cl.
    CPC .......... *H04W 16/12* (2013.01); *H04B 1/715* (2013.01); *H04L 27/2601* (2013.01); *H04B 2001/7154* (2013.01)

(58) Field of Classification Search
    None
    See application file for complete search history.

(56) References Cited

U.S. PATENT DOCUMENTS 6,023,459 A * 2/2000 Clark ................. H04W 16/18
                                                370/329

FOREIGN PATENT DOCUMENTS

| CN | 102843691 B | 1/2015 |
|----|-------------|--------|
| KR | 10-1023560  | 3/2011 |
| WO | 00/54440    | 9/2000 |

OTHER PUBLICATIONS

Montemanni Roberto et al., "Heuristic manipulation, tabu search and frequency assignment", Computers & Operations Research 37, 2010, all pages. (Year: 2010).*

Montemanni, et al. ; An Improved Tabu Search Algorithm for the Fixed-Spectrum Frequency-Assignment Problem ; IEEE Transactions on Vehicular Technology, vol. 52, No. 3 ; May 2003 ; 11 Pages.

(Continued)

*Primary Examiner* — Srinivasa R Reddivalam
(74) *Attorney, Agent, or Firm* — Oblon, McClelland, Maier & Neustadt, L.L.P.

(57) ABSTRACT

A search-based heuristic for assigning frequencies to transmitters in a fixed spectrum frequency assignment (FS-FA) telecommunications network in order to satisfy a set of frequency constraints is described. Each connection in a network must have a frequency assigned from the spectrum which satisfies the set of constraints, which specify the frequency separation which is necessary between frequencies assigned to different transmitters. Violation of these constraints creates interference, which must be minimized. The exemplary heuristic has two main components: a local search heuristic and a compound move. The local search heuristic employs one-change moves and a lookup table that classifies all possible one-change moves as positive or negative, which are chosen until a locally minimal solution is found. The compound move operation shifts the local search to a new location in the search space. The local search and compound move are iterated until a total interference cost function is minimized.

4 Claims, 12 Drawing Sheets

(56) References Cited

OTHER PUBLICATIONS

Galinier, et al. ; Solving the Frequency Assignment Problem with Polarization by Local Search and Tabu ; Mar. 2005 ; 15 Pages.

Liwei, et al. ; Simulated Annealing Algorithm in solving Frequency Assignment Problem ; $3^{rd}$ International Conference on Advanced Computer Theory and Engineering(ICACTE); 2010 ; 4 Pages.

Osman, et al. ; Minimizing Interference In Frequency Assignment Problem Based On Guided Particle Swarm Optimization Algorithm; International Journal of Scientific & Technology Research, vol. 6, Issue 12 ; Dec. 2017 ; 8 Pages.

Matsui, et al. ; A New Genetic Algorithm for Minimum Span Frequency Assignment using Permutation and Clique ; Communication and Information Research laboratory ; 8 Pages.

Eddelbuettel, et al. ; Seamless R and C++ Integration ; Nov. 7, 2018 ; 38 Pages.

Lahsinat, et al. ; Iterated Harmony Differential Search for the Minimum Interference Frequency Assignment Problem ; 2017 International Conference on Mathematics and Information Technology ; Dec. 4-5, 2017 ; 6 Pages.

Marti, et al. ; Heuristics for the Bandwidth Coloring Problem ; https://www.researchgate.net/publication/213171975 ; Jan. 2010 ; 20 Pages.

Matic, et al. ; Variable Neighborhood Search for solving Bandwidth Coloring Problem ; Computer Science and Information Systems 14(2); pp. 309-327 ; Mar. 20, 2017 ; 20 Pages.

Lai, et al. ; Path relinking for the fixed spectrum frequency assignment problem ; Expert Systems with Applications 42 ; pp. 4755-4767 ; Jan. 30, 2015 ; 13 Pages.

Segura, et al. ; Improving Diversity in Evolutionary Algorithms: New Best Solutions for Frequency Assignment; IEEE Transactions on Evolutionary Computations, vol. 21, No. 4 ; Aug. 2017 ; 15 Pages.

Frequency Allotments ; 2008 Edition (Rev. May 2012) ; pp. 4-138-4-190 ; 2008 ; 53 Pages.

FCC ; FCC Online Table of Frequency Allocations ; Oct. 5, 2018 ; 177 Pages.

Yu-Bin, et al. ; A Tabu Search Algorithm for Frequency Assignment Problem in Wireless Communication Networks ; 2009 ; 4 Pages.

Alrajhi ; Heuristic Algorithms for Static and Dynamic Frequency Assignment Problems ; Thesis to Cardiff University ; Jul. 2016 ; 202 Pages.

Aardal, et al. ; Models and solution techniques for frequency assignment problems* ; Sep. 2003 ; pp. 261-317 ; 57 Pages.

Hao, et al. ; Tabu Search for Frequency Assignment in Mobile Radio Networks ; Journal of Heuristics 4 ; pp. 47-62 ; 1998 ; 16 Pages.

\* cited by examiner $$\begin{bmatrix} 2 & 2 & ① & 0 \\ ① & 2 & 1 & 1 \\ ① & 2 & 3 & 2 \\ 2 & 3 & 1 & ① \\ 1 & 1 & ① & 1 \\ ⓪ & 1 & 2 & 2 \end{bmatrix}$$

FIG. 5B

$$\begin{bmatrix} 1 & 1 & ① & 1 \\ 1 & 2 & 1 & ① \\ ⓪ & 1 & 3 & 3 \\ 2 & 3 & 1 & ① \\ 1 & 1 & ① & 1 \\ ⓪ & 1 & 2 & 2 \end{bmatrix}$$

FIG. 5C

SEARCH-BASED HEURISTIC FOR FIXED SPECTRUM FREQUENCY ASSIGNMENT

BACKGROUND

Technical Field

The present disclosure is directed to fixed spectrum frequency assignment (FS-FA) in a telecommunications network by applying a heuristic to determine the assignment of frequencies for the transmitters in order to minimize the total interference.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In wireless communication, the wireless service providers (e.g., GSM network operators) have a license to use a small set of frequencies from the available radio spectrum. The minimum and maximum frequencies licensed to a service provider can be denoted as $f_{min}$ and $f_{max}$. The service provider divides the band available to it into channels of bandwidth $\Delta_w$.

The number of channels is given by $$N = \frac{fmax - fmin}{\Delta w}.$$

Frequency allocations are determined by state and local authorities, depending on type of communication. Frequency allotment and channel assignments for short distance, low power radio communications, radio signalling and the control of remote objects or devices by means of radio are established by the U.S. Government. (See "Frequency Allotments" 2008 Edition, May 2012, Chapter 4, pp. 138-190, https://www.ntia.doc.gov/files/ntia/publications/redbook/2012-05/4d 12.pdf, and "FCC Online Table Of Frequency Allocations", Federal Communications Commision Office Of Engineering And Technology Polisncy And Rules Division. 47 C.F.R Sec 2.106, Oct. 5, 2018, https://transition.fcc.gov/oet/spectrum/table/fcctable.pdf, each incorporated herein by reference in its entirety)

The number of channels available to a service provider is limited, and therefore, the reuse of channels is necessary within a network. However, the reuse of channels causes interference in the network. Conventionally, the frequency assignment (FA) problem represents the spectrum as a set of several distinct frequencies. Channel is often used interchangeably with frequency because of the fact that each channel is characterized by a unique frequency range.

Frequency assignment is an important problem in wireless communication networks. It is used in many different types of wireless communication systems such as satellites and cellular networks. A heuristic, or set of strategy rules, is needed for the fixed spectrum frequency assignment (FS-FA) problem. The input to an FS-FA problem is a fixed spectrum of frequencies, a set of transmitters, and a set of constraints. The constraints specify the minimum separation necessary between frequencies assigned to different transmitters. When frequencies of any two transmitters have separation less than the amount specified in a constraint, they create interference. (See Audhya, G. K.; Sinha, K.; Ghosh, S. C.; Sinha, B. P.: "A survey on the channel assignment problem in wireless networks". Wirel. Commun. Mob. Comput. 11(5), 583-609 (2011). https://doi.org/10.1002/wcm.898m, incorporated herein by reference in its entirety). The FS-FA problem can be converted to the classic graph coloring problem and is therefore an NP-hard problem. (See Hale, W. K.: "Frequency assignment: theory and applications". Proc. IEEE 68(12), 1497-1514 (1980). https://doi.org/10.1109/PROC. 1980.11899; Garey, M.; Johnson, D.: "Computers and Intractability: A Guide to the Theory of NP-completeness". In: Freeman, W. H. (ed.) Books in Mathematical Series (1979). https://books.google.com.sa/books?id=fjxGAQAAIAAJ; and Segura, C.; Hernandez-Aguirre, A.; Luna, F.; Alba, E.: "Improving diversity in evolutionary algorithms: New best solutions for frequency assignment". IEEE Trans. Evol. Comput. 21(4), 539-553 (2017). https://doi.org/10.1109/TEVC.2016.2641477, Matsui, S.; Tokoro, K., "A New Genetic Algorithm for Minimum Span Frequency Assignment using Permutation and Clique". The Transactions of the Institute of Electronics, Information and Communication Engineers. B00084(00006), 982-987, 2001-06-01, each incorporated herein by reference in their entirety).

In graph theory, graph coloring is a special case of graph labeling; it is an assignment of labels traditionally called "colors" to elements of a graph subject to certain constraints. In its simplest form, it is a way of coloring the vertices of a graph such that no two adjacent vertices are of the same color; this is called a vertex coloring.

NP-hardness (non-deterministic polynomial-time hardness), in computational complexity theory, is the defining property of a class of problems of high computational complexity. Polynomial time is the time required for a computer to solve a problem, where this time is a simple polynomial function of the size of the input function. NP is a complexity class that represents the set of all decision problems for which the instances where the answer is "yes" have proofs that can be verified in polynomial time.

Heuristics are frequently used to solve the FS-FA problem. The optimization heuristics can be classified as neighborhood search and global search. Neighborhood search heuristics (also known as local search heuristics) aim to find a solution within a smaller region around the initial solution. Global search heuristics, on the other hand explore a larger region of the solution space in search of a solution. The FS-FA problem has previously been solved using neighborhood search heuristics. Global search heuristics also repeatedly apply local search heuristics at different places in the search space to find the optimal solution. Therefore, local search heuristics are critical in solving the FS-FA problem.

The classification of heuristics is not only based on their region of search (local search or global search), but they can also be classified based on other properties. Some popular classifications of heuristics are as follows: (i) population-based and single-solution-based heuristics, and (ii) memory-less and memory-based heuristics. Single-solution-based heuristics use less memory and computational resources as compared to population-based heuristics. Examples of population-based heuristics include the genetic algorithm (GA) and particle swarm optimization. (See Sait, S. M.; Youssef, H.: "Iterative Computer Algorithms with Applications in Engineering". IEEE Computer Society Press, California (1999); Beckmann, D.; Killat, U.: "A new strategy for the application of genetic algorithms to the channel assignment problem". IEEE Trans. Veh. Technol. 48(4), 1261-1269 (1999). https://doi.org/10.1109/25.775374; and Ngo, C. Y.; Li, V. O. K.: "Fixed channel assignment in cellular radio networks using a modified genetic algorithm". IEEE Trans. Veh. Technol. 47(1), 163-172 (1998). https://doi.org/10.1109/25. 661043, each incorporated herein by reference in their entirety). The memory-less heuristics do not keep track of their previous moves or move attributes, whereas memory-based heuristics remember their last moves and choose new moves using their memory. The Tabu search (TS) heuristic belongs to the category of memory-based, single-solution local search heuristics.

Several heuristics have been proposed to solve the FS-FA problem. These include population type, those that work on single solution, and those that use memory to store history. Population-based heuristics simultaneously search different locations in the search space and depend on a local search heuristic to find the locally optimal solutions at each location. Single-solution-based heuristics, on the other hand, search one location at a time; however, they can shift to a new location using a proper move operation. (See C. Segura et al.; D. Beckmann et al.; C. Y. Ngo et al.; Montemanni, R.; Moon, J. N. J.; Smith, D. H.: "An improved tabu search algorithm for the fixed-spectrum frequency-assignment problem". IEEE Trans. Veh. Technol. 52(4), 891-901(2003). https://doi.org/10.1109/TVT.2003.810976; Montemanni, R.; Smith, D. H.: "Heuristic manipulation, tabu search and frequency assignment". Comput. Oper. Res. 37(3), 543-551 (2010). https://doi.org/10.1016/j.cor.2008.08.006; Galinier, P.; Hao, J. K.: "A general approach for constraint solving by local search". J. Math. Modell. Algorithms 3(1), 73-88 (2004). https://doi.org/10.1023/B:JMMA.0000026709.24659.da; Liwei, L.; Rongshuang, F.: "Simulated annealing algorithm in solving frequency assignment problem". In: 2010 3rd International Conference on Advanced Computer Theory and Engineering(ICACTE), vol 1, pp V1-361-V1-364 (2010). https://doi.org/10.1109/ICACTE.2010.5579000; Duque-Anton, M.; Kunz, D.; Ruber, B.: "Channel assignment for cellular radio using simulated annealing". IEEE Trans. Veh. Technol. 42(1), 14-21 (1993). https://doi.org/10.1109/25.192382; and Lai, X.; Hao, J. K.: "Path relinking for the fixed spectrum frequency assignment problem". Expert Syst. Appl. 42(10), 4755-4767(2015). https://doi.org/10.1016/j.eswa.2015.01.025; Jin-Kao Hao, Raphael Dome And Philippe Galinier. "Tabu Search for Frequency Assignment in Mobile Radio Networks" Journal of Heuristics, 4: 47-62 (1998); Zhang Yu-Bin, Zhao Yu-Cai, Xiong Hui. "A Tabu Search Algorithm for Frequency Assignment Problem in Wireless Communication Networks". 2009 IEEE; Aardal, K., Van Hoesl, Stan, Koster, A. Mannino, C, Sassano, A. "Models and solution techniques for frequency assignment problems". Quarterly Journal of the Belgian, French and Italian Operations Research Societies. 2003; Lahsinat, Y, Boughaci, D, Benhamou, B. "Iterated Harmony Differential Search for the Minimum Interference Frequency Assignment", 2017 International Conference on Mathematics and information Technology, Adrar, Algeria—Dec. 4-5, 2017, each incorporated herein by reference in their entirety).

A survey of literature on the application of single-solution-based heuristics to the FS-FA problem reveals that memory-based heuristics (i.e., TS-algorithm) outperform memory-less heuristics such as simulated annealing (SA) and threshold accepting (TA). (See Dueck, G.; Scheuer, T.: "Threshold accepting: a general purpose optimization algorithm appearing superior to simulated annealing". J. Comput. Phys. 90(1), 161-175 (1990). https://doi.org/10.1016/0021-9991(90)90201-B; and Correia, L. M.: "Wireless flexible personalised communications: COST 259, European co-operation in mobile radio research". Wiley, Chichester (2001), http://lib.ugent.be/catalog/rug01:001649471; Alrajhi, K., "Heuristic Algorithms for Static and Dynamic Frequency Assignment Problems", PhD Thesis, Cardiff University. http://orca.cf.ac.uk/94194/, each incorporated herein by reference in their entirety).

A bandwidth coloring problem (BCP) is closely related to the FA problem. The bandwidth coloring problem consists of assigning a color to each vertex of a graph, so that the absolute value of the difference between the colors of adjacent vertices is at least the value of the weight of the associated edge. This problem generalizes the classical vertex coloring problem. The BCP problem is also solved using TS-based and neighborhood search heuristics. A heuristic that applies local search is identifying the neighborhoods which have good solutions. It also uses a shaking operation to discover new neighborhoods. The local search heuristics for the FA problems are also useful in solving the BCPs. (See Marti, R.; Gortazar, F.; Duarte, A.: "Heuristics for the bandwidth colouring problem". Int. J. Metaheuristics 1(1), 11-29 (2010). https://doi.org/10.1504/IJMHEUR.2010.033121; and Matic, D.; Kratica, J.; Filipovic, V.: "Variable neighborhood search for solving bandwidth coloring problem". Comput. Sci. Inf. Syst. 14, 309-327 (2017), each incorporated herein by reference in their entirety).

The exemplary heuristic of the present disclosure is a single-solution, memory-less type of heuristic that can solve the FS-FA problem and produce results competitive with the existing TS-based heuristics. The exemplary heuristic contributes toward improvement in the design of heuristics in solving important industrial problems. Experiments were conducted and compared to benchmark results found by existing heuristics.

SUMMARY

Embodiments of the present disclosure describe a neighborhood search-based heuristic method for assigning frequencies for transmitters in a fixed spectrum frequency assignment (FS-FA) telecommunications network in order to satisfy a set of frequency constraints. An exemplary heuristic is used to move each frequency assigned to each transmitter in a local search space a small amount in a positive or negative direction until an interference cost function of a transmitter set is minimized. The heuristic then moves to a second, neighborhood search space, and repeats the heuristic to minimize the interference cost function of each transmitter in the neighborhood search space. A total cost function is computed and the transmitter assignments are stored in an archive. The heuristic is iterated until a pre-set maximum number of iterations is reached. The frequency assignment may then be output to a display, transmitter, printer, or the like.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 5B shows the contents of an LUT having a cost equal to 3.

FIG. 5C shows the contents of an LUT having a cost equal to 2.

DETAILED DESCRIPTION

Figure 1:
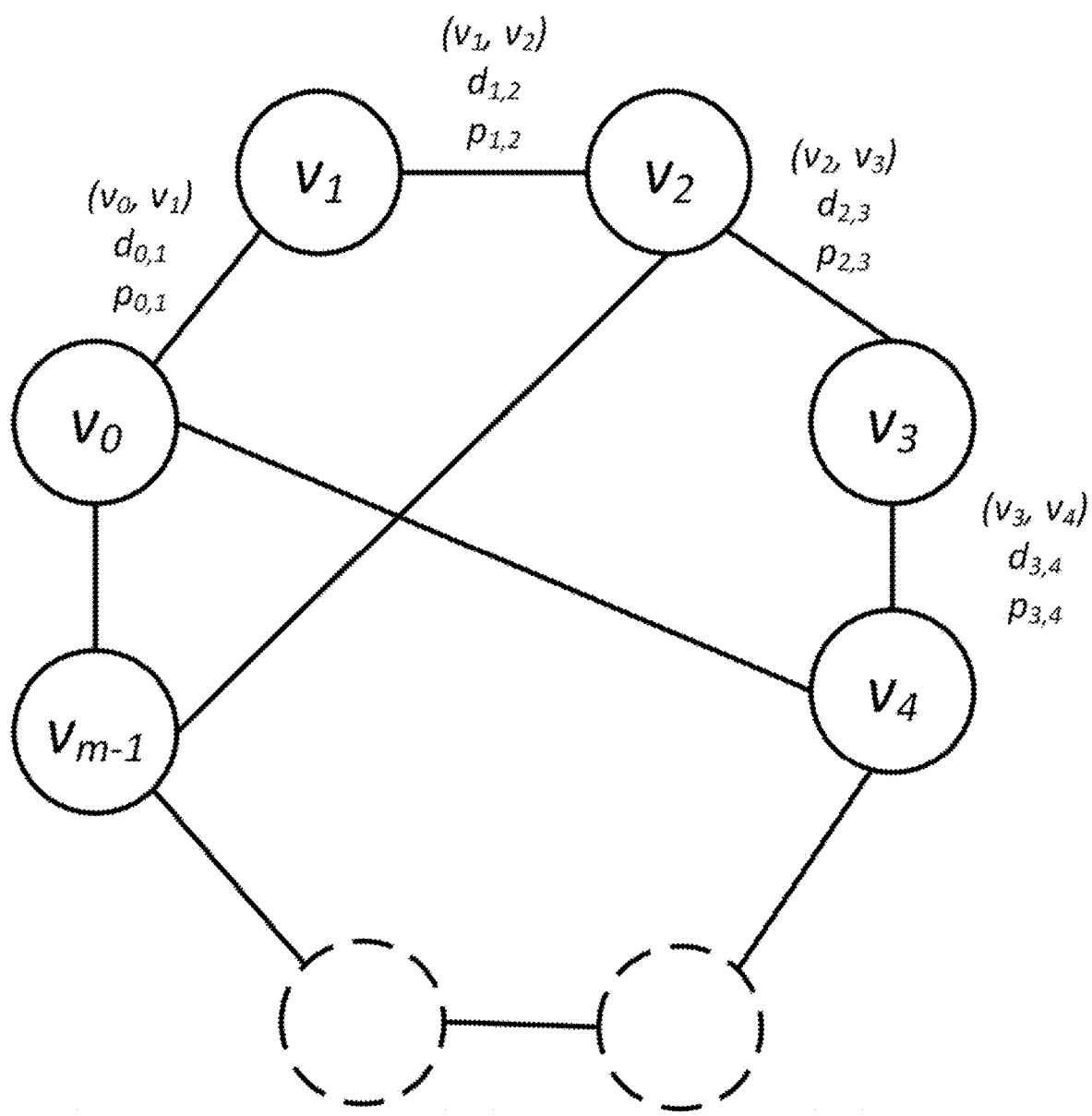
FIG. 1 is a graph theory model of the frequency assignment problem.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

An "archive" is defined as a file that stores file system data and metadata within the contents of a particular file.

The term "elitism" refers to a process in which the best or most optimum results from a procedure, such as a search algorithm, are used as inputs to the next procedure or iteration. This strategy is known as elitist selection and guarantees that the solution quality will not decrease from one search to the next.

The term "pseudocode" is an informal high-level description of the operating principle of a computer program or other algorithm. It uses the structural conventions of a normal programming language, but is intended for human reading rather than machine reading. Pseudocode typically omits details that are essential for machine understanding of the algorithm, such as variable declarations, system-specific code and some subroutines. The programming language is augmented with natural language description details, where convenient, or with compact mathematical notation.

The term "constraint" refers to the minimum separation necessary between frequencies assigned to different transmitters. When frequencies of any two transmitters have separation less than the amount specified in a constraint, interference occurs.

A telecommunications network includes transmitters, receivers and a control center, such as a base station having base station physical layer. The base station has architecture including a physical layer comprising an electrical, mechanical and procedural interface to the base station. The physical layer controls the transmission of signals from the transmitters of the base station. A software layer determines the frequency assignment and routing of the signals through the physical layer to the antennas. Receivers in the telecommunications network may be wireless units, such as cell phones or other access points, and receivers in the base station. Wireless signals are transmitted at assigned frequencies to the receivers. Based on constraints, such as the physical spacing between the transmitters, power availability, power ratings, etc., the assigned frequencies must be chosen to minimize interference between the transmitters in the wireless network.

Frequency assignment is a very important, but difficult, NP-hard problem. The radio frequency spectrum is a limited natural resource used in a variety of private and public services, such as in cellular mobile phone networks. The radio spectrum available needs to be assigned as efficiently and effectively as possible. Frequencies must be assigned to a set of transmitters in such a way that certain compatibility constraints, which model potential interference between pairs of transmitters, are satisfied. In addition to satisfying the constraints the objective is to minimize the span of the assignment, i.e., to minimize the difference between the largest frequency and the smallest frequency used.

Interference can occur between a pair of transmitters if the strength of the interfering signal is sufficiently high. Whether a transmitter pair has the potential to interfere depends on many factors, e.g., distance, terrain, power, or antenna design. The higher the potential for interference between a transmitter pair, the larger the frequency separation required. For example, if two transmitters are sufficiently geographically separated then a frequency can be re-used, i.e., the same frequency can be assigned. At the other extreme if two transmitters are located at the same site then they may require, for example, five frequencies separation. As a general rule, the following three constraints are taken into account.

1) Co-channel constraints: A pair of transmitters located at different site must not be assigned the same frequency unless they are sufficiently separated geographically to reduce interfering signal strength.

2) Adjacent channel constraints: When a transmitter and receiver are tuned to similar frequencies, there is still the potential for interference. Therefore there should be some separation between two frequencies.

3) Co-cite channel separation: Any pair of frequencies assigned to transmitters at the same site must be separated by a certain fixed number of channels. This number is usually significantly larger than the adjacent channel constraints.

In order to model these constraints, a constraint matrix is constructed which provides the separations needed between each transmitter pair. This matrix is usually represented by an m×m matrix D (m is the number of transmitters in the telecommunications network) where each element $d_{ij}$ denotes the frequency separation between transmitters i and j, i.e., if $f_i$ and $f_j$ are the frequencies assigned to transmitter i and j respectively, then the following condition should be satisfied for all i and j: $|f_i-f_j| \geq d_{ij}$. The set of frequencies to be assigned depends on the type of transmitter. In a non-limiting example, the frequency spectrum may be the set F={0, 0.1, 0.02, . . . , 1.0} Hz. In another non-limiting example, the frequency spectrum may be the set F={0, 0.1, 0.02, . . . , 1.0} MHz. In a further non-limiting example, for communications in the PCS band, the frequency spectrum may be the set F={824, 825, . . . , 894} MHz. In a further non-limiting example, for cell phone communications in the cellular band, the frequency spectrum may be the set F={1850, 1860, . . . , 1990} MHz. The frequency spectrum may be the set F={1860, 1861, . . . , 1880} MHz.

Aspects of this disclosure are directed to a method and computer readable medium having instructions stored therein that, when executed by one or more processor, cause the one or more processors to perform neighborhood search-based heuristic method for assigning frequencies for transmitters in a fixed spectrum frequency assignment (FS-FA) telecommunications network, the network having a plurality of wireless transmitters and at least one wireless receiver, in a manner in which a set of frequency constraints are satisfied.

A heuristic is needed for the fixed spectrum frequency assignment (FS-FA) problem. In general, a heuristic is defined as a strategy employed for solving a problem, where the strategy is derived from previous experiences with similar problems. A fundamental example of a heuristic is trial and error.

The inputs to an FS-FA problem are a fixed spectrum of frequencies, a set of transmitter locations, and a set of constraints. The constraints specify the minimum separation necessary between frequencies assigned to different transmitters. When frequencies of any two transmitters have separation less than the amount specified in a constraint, they create interference.

The goal of any heuristic designed to solve the FS-FA problem must be to determine an assignment of frequencies for the transmitters that can minimize the total interference that could occur due to the violation of constraints.

A model of the FS-FA problem is presented from the graph theory perspective. In the present disclosure, the FA problem is modeled using a graph. In this model, transmitters are represented as vertices and each transmitter needs a channel or frequency to be assigned from the spectrum. In wireless communications, the frequency used by a transmitter could interfere with other transmitters present in the nearby region. The interference noise is measured in terms of dBm. The interference is minimum when the neighboring transmitters use frequencies that are far apart from each other. The graph model uses edges to indicate which transmitters could interfere with each other. The weights of the edges denote the minimum difference necessary between the frequencies of the transmitters and the value of the penalty if the transmitters do not meet the separation requirement. The penalty values denote the interference noise that could add to the data transmission. In the graph model, the choice of units depends on the transformation of an FA problem to its graph-based model.

FIG. 1A depicts a model of the FA problem. The FA-problem is modeled using a weighted and undirected quadruple graph G(V, E, D, P). The set V contains vertices of the transmitters, and E contains edges. The vertices represent the transmitters to which frequencies should be assigned and are represented by V={$v_0$, $v_1$, . . . , $v_{m-1}$}, where m is the total number of transmitters. The edges, E, connect any two vertices (or transmitters) and are used to indicate that a separation constraint exists between those two transmitters. An edge is represented by ($v_i$, $v_j$), where $v_i$ and $v_j \in$ E. The set D contains the weights of the edges and a mapping E→D exists such that ($v_i$,$v_j$) is mapped to $d_{ij}$, where $d_{ij}$ is the amount of separation necessary between the frequencies assigned to $v_i$ and $v_j$. The set P contains the penalties for the violation of constraints. There is a mapping E→P, such that ($v_i$, $v_j$) is mapped to $p_{ij}$, where is a penalty to be paid if the separation between the frequencies assigned to V, and $v_1$ is less than $d_{ij}$. The spectrum of frequencies available to the transmitters is represented by F and contains up to n channels (N distinct frequencies). The spectrum is represented as follows: F={$f_0$, $f_1$, . . . , $f_{n-1}$}. The frequencies for the transmitters should be selected from F.

As the sets D and P contain weights of the edges, E has a one-to-one correspondence with D and P. Any element $d_{i,j} \in$ D corresponds to the edge ($v_i$, $v_j$)∈E. Similarly, any element $p_{i,j} \in$ P corresponds to the edge ($v_i$, $v_j$)∈E. The set D contains the values of the separation constraints and the set P contains the penalties (i.e., an increase in interference of the solution) for the violation of constraints.

The solution of the FS-FA problem is an ordered set that contains elements equal to the number of transmitters (i.e., m). The solution is represented by Δ={$\delta_0$, $\delta_1$, . . . , $\delta_{m-1}$}, where $\delta_k$ is the frequency of the transmitter $v_k$.

Interference may exist between transmitters $v_i$ and $v_j$, if there exists ($v_i$, $v_j$)∈E and the frequencies of $v_i$ and $v_j$ violate the separation constraint $d_{i,j} \in$ D. The mathematical expression to compute the interference, I($v_i$, $v_j$), is as follows:

$$I(vi, vj) = \begin{cases} p_{i,j} & \text{if } |\delta_i - \delta_j| < d_{i,j} \\ 0 & \text{otherwise} \end{cases} \quad (1)$$

for all ($v_i$, $v_j$)∈E. In equation (1), $p_{i,j}$ represents the interference penalty when the frequencies assigned to transmitters i and j are closer than the separation constant $d_{i,j}$.

The cost of the solution (or total interference) is the sum of the penalties of all violating constraints. The cost of the solution (Δ) can be determined using (2):

$$\text{cost}(\Delta) = \sum_{(v_i,v_j) \in E} I(v_i, v_j) \quad (2)$$

$$\text{Minimize}(\text{cost}(\Delta)) \quad (3)$$

To summarize, the cost is the total of the interferences between each ordered pair of transmitters. The goal is to minimize the cost.

Details of the heuristic of the present disclosure for solving the FS-FA problem are shown below. Algorithm 1 presents the steps of the exemplary heuristic based on the graph of FIG. 1.

---
Algorithm 1:
---

Input: G(V, E, D, P), F, β, $\rho_1$, $\rho_2$, γ
1: Intialization: Initialize the solution (Δ) to a random value, $\Delta_{best}$ = Δ, and α = 0
2: while Stopping criterion is not reached do

Algorithm 1:

3:  Local Search: Apply the local search heuristic with the initial solution equal to Δ.
4:  Update Archive: Conditionally copy the solution (Δ) into the archive (α) and update $\Delta_{best}$
5:  Shifting: Apply a compound move to shift the search to a new location in the search space
6:  endwhile
7:  return $\Delta_{best}$ The input consists of the quadruple graph (G(V, E, D, P)), spectrum (F) and four parameters (β, $h_1$, $h_2$, and γ). The value of β controls the termination of a local search, while $h_1$ and $h_2$ are the probabilities used in the compound move. The parameter γ sets the size of the archive which has an important role in the compound move.

In a non-limiting example, β is in the range of 1,000 to 50,000, preferably 1,000 to 20,000, more preferably 1,000 to 10,000, even more preferably, 2,000 to 10,000. In a further non-limiting example, γ is in the range of 10 to 200, preferably 20 to 100. The probabilities $h_1$, $h_2$ range from 0 to 1, preferably from 0.2 to 0.5.

The steps of the exemplary heuristic are described below.

Step 1: Initialization

In this step, the solution (Δ) is initialized by assigning random frequencies to the transmitters. The heuristic of the present disclosure also employs an archive (α) to store up to γ solutions. The archive (α) initializes to an empty set. The exemplary heuristic also uses elitism and keeps a copy of the best seen solution thus far in $\Delta_{best}$. The "best" solution is that which provides the lowest cost function as computed by eq. 2 and eq. 3.

Step 2: WHILE stopping criterion is not reached, DO Steps 3-5.

Step 3: Local Search

Figure 2A:
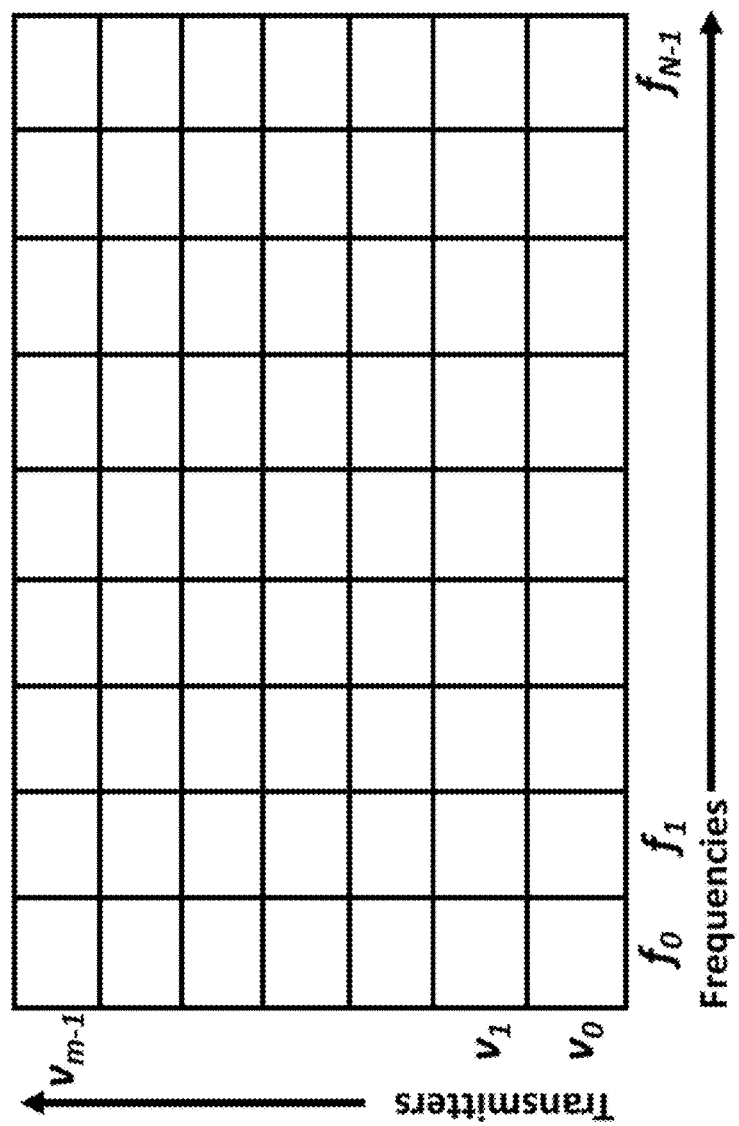
FIG. 2A illustrates an LUT.

A single-solution, memory-less local search heuristic for the FS-FA problem is described. The local search heuristic employs a lookup table (LUT) to reduce computations. FIG. 2A depicts an LUT in which each location (i,j) corresponds to a unique frequency $f_i$ and transmitter $v_j$. The LUT stores the objective function value when the transmitter $v_j$ uses the frequency $f_i$.

Figure 2B:
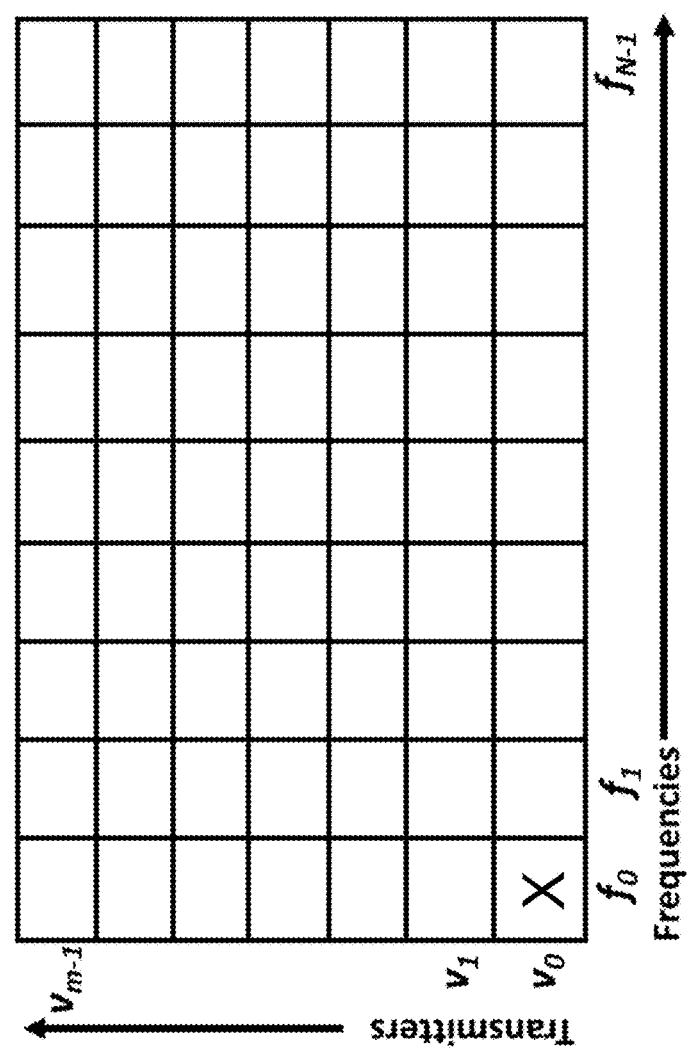
FIG. 2B illustrates the contents stored in an LUT.

The lookup table (LUT) contains precomputed values of the possible increase/decrease in interference when any transmitter changes its frequency to another one from the spectrum. FIG. 2B shows the contents, (depicted by X) of the LUT at cell ($f_0$, $v_0$). X denotes the sum of the penalties due by the violation of constraints denoted by edges whose any one node is $v_0$, when the frequency of $v_0$ is $f_0$ in the current solution. The current solution, Δ, is Δ={$δ_0$, $δ_1$, ..., $δ_{m-1}$}.

The contents of the LUT are generated by using Algorithm 2. The input is the graph G of FIG. 1 that models the FA problem.

Algorithm 2:

Data: E, V
Result: LUT
for x = 0 to m-1 do
   E' = {($v_i$, $v_j$) ∈ E|$v_i$ = $v_x$ or $v_j$ = $v_x$};
   V' = {$v_k$ ∈ V|($v_k$, $v_l$) ∈ E' or ($v_l$, $v_k$) ∈ E'}, l= 0 to m − 1;
   V' = V' − $v_x$;
   for z = 0 to n-1 do
      cs= 0;
      for y=0 to m-1 do
         if $v_y$ ∈ V' then

Algorithm 2:

if |$f_z$ − $δ_y$| < $d_{x,y}$ then
               cs= cs + $p_{x,y}$ ;
            end
         end
      end
      LUT[x, z]= cs;
   end
end The outermost loop executes for as many numbers of times as the number of transmitters in the network (i.e., m). The symbol $v_x$ denotes the transmitter selected in the current iteration. The set E' contains the edges (or constraints) that are related to $v_x$ because of one of their nodes being equal to $v_x$. The set V' contains the nodes that lie at the ends of edges selected in E' The nested FOR loops compute one complete row of the LUT (i.e., when the index of the transmitter is kept fixed, and the index of the frequencies vary from 0 to n−1, where n is the total number of frequencies). The variable z holds the index of frequencies and $f_z$ indicates the frequency that lies at the zth position in the spectrum. The inner-most FOR loop computes the sum of the penalties (denoted by cs) when the transmitter $v_x$ has frequency $f_z$.

However, the contents of the cells of the LUT depend on a current solution which needs to be updated after any change in the current solution. An incremental update is made to a small portion of the LUT after a change in the frequency of a transmitter. The heuristic uses the LUT to choose a positive move. However, when the LUT does not allow any positive moves, the heuristic chooses a negative move. The successive application of positive and/or negative moves results in an efficient local search. The exemplary heuristic also employs a compound move to shift the search to a new location in the search space.

The move operations in the local heuristic change the frequency of only one transmitter. The total number of moves is equal to mN, where m is the number of transmitters, and N is the number of frequencies in the spectrum. The evaluation of all mN moves in every iteration would be time consuming. However, the change in cost of only a few moves needs to be evaluated in each iteration. When the frequency of transmitter $v_i$ is changed, only the moves that belong to the transmitters $v_j$ that have a constraint with $v_j$ (the vertices of each of the m transmitters in the set V) need re-evaluation. In this way, maintaining an LUT helps to reduce the computation and improves the runtime of the heuristic. The LUT has a number of columns equal to the number of frequencies (N frequencies) to be assigned (that is, the size of the spectrum) and number of rows equal to the number of transmitters, thus is an M by N matrix. An element (i,j) stores a positive penalty value if the assignment of the frequency $f_j$ to the transmitter $v_i$ violates any separation constraint. The contents of the LUT depend on the value of the current solution (Δ). Therefore, the LUT requires an update for any change in the current solution. The procedure to update some entries of the LUT is mentioned below. The value for the index (i,j) in the LUT can be determined using (4) and (5), where (i,j) denotes a position in the LUT that needs an update. The value of each entry in the LUT can be determined using (4) and (5).

$$J(i, j, k) = \begin{cases} p(i, k) & \text{if } |f_j - \delta_k| < d_{i,k} \\ 0, & \text{otherwise} \end{cases} \quad (4)$$

$$LUT(i, j) = \sum_{k=0}^{n-1} J(i, j, k) \quad (5)$$

In (4), J(i, j, k) refers to the penalty value. If the difference between the frequency $f_j$ and the solution frequency $\delta_k$ is less than $d_{ij}$ (the amount of separation necessary between the frequencies assigned to $v_i$ and $v_j$), then the penalty is p(i,k). In other words, Ai, j, k) returns a zero value if there does not exist $(v_i, v_k \in E)$ and returns a nonzero value if the assignment of frequency $f_j$ to $v_i$ violates the separation constraint specified by the edge position $(v_i, v_k)$ of the ith and kth transmitter, where the frequency of $v_k$ is $\delta_k$. In (5), the value is computed to store at the location (i,j) in the LUT. A nested FOR loop is used in which i varies from 0 to m−1 and j varies from 0 to n−1 to determine the contents of the complete LUT.

The local search heuristic uses the LUT to choose a move. By a move is meant changing the frequency assigned to a transmitter in the current solution (Δ). A move is represented by a 2-tuple (i,j), where i refers to the transmitter $v_i$ and j refers to the frequency $f_j \in F$. The moves are divided in the LUT into two types: (i) positive moves; and (ii) negative moves. A positive move (i,j) E LUT meets the condition that LUT(i,j)<LUT(i, $\delta_i$), where $\delta_i$ is the current frequency of $v_i$. When the move (i,j) is applied to the current solution, then the frequency of the transmitter $v_i$ (i.e., $\delta_i \in \Delta$) changes to $f_j$. The cost of the solution decreases after the application of a positive move. Negative moves include all the moves in the LUT that do not belong to the type of positive moves. A negative move also changes the frequency of a transmitter, but the cost of the solution either remains unchanged or increases. During the execution of the heuristic, positive moves might not always be available. However, negative moves are always available. For a transmitter $v_i$, $\xi^+(i)$ represents a set of available positive moves and $\xi^-(i)$ represents a set of available negative moves in the LUT. We can determine the elements for the sets $\xi^+(i)$ and $\xi^-(i)$ using (6) and (7).

$$\xi(i)^+ = \{(i,j), \text{s.t.} \text{LUT}(i,j) < \text{LUT}(i,\delta_i)\} \quad (6)$$

$$\xi(i)^- = \{(i,j), \text{s.t.} \text{LUT}(i,j) \geq \text{LUT}(i,\delta_i)\} \quad (7)$$

where s.t. means "such that".

A complete description of the proposed local search heuristic is depicted in Algorithm 3. The input to the heuristic consists of the following items: (i) the current solution (Δ); (ii) A set of frequencies (F); (iii) the graph that models the problem, (G); and (iv) three parameters (β, $\rho_1$, and $\rho_2$). The value of β is a positive integer, and the values of remaining two parameters, $\rho_1$ and $\rho_2$, are real numbers between 0 and 1.

---
Algorithm 3:
---

Input: G(V, E, D, P), F, β, $\rho_1$, $\rho_2$, Δ
1: Intialize the LUT
2: $\Delta_T = \Delta$, i = 0
3: while i < β do
4:   if Any positive-move exists in the LUTs then
5:     Randomly selects a positive-move and apply it to the Δ
6:     if cost(Δ) < cost($\Delta_T$) then
7:       $\Delta_T = \Delta$, i = 0
8:     else
9:       i = i + 1
10:    endif
11:  else
12:    Selects a negative-move with the help of the LUT and apply it to Δ
13:    i = i + 1
14:  endif
15:  Update the LUT
16: endwhile
17: Δ = $\Delta_T$
18: return Δ

---

In the pseudocode of Algorithm 3, the execution flow is as follows. In line 1, the LUT is initialized by using Algorithm 2. In line 2, two variables $\Delta_T$ and i are introduced that store the best solution and the number of successive iterations with no improvement in the cost of the solution, respectively. The variable i as used in Algorithm 3 should not be confused with the ith transmitter $v_i$. The variable i is merely used as a general subscript representing a series. The WHILE loop implements the termination condition of the local search heuristic. In line 4, equation (8) is used to determine the availability of any positive move in the LUT. In (8), the set $\xi^+$ contains all positive moves present in the LUT. When $\xi^+$ is empty, then no positive moves exists. The set $\xi^-$ in (9) contains all negative moves present in the LUT.

$$\xi^+ = \cup_{i=0}^{n-1} |\xi^+(i)| \quad (8)$$

$$\xi^- = \cup_{i=0}^{n-1} |\xi^-(i)| \quad (9)$$

In line 5, a move is randomly selected from $\xi^+$ and updates the frequency of a transmitter in the current solution (Δ). The lines 6-10 consist of the following tasks: if the cost of the current solution Δ is better (or less than) than the cost of the best solution $\Delta_T$ then $\Delta_T$ is updated, and the variable i is re-initialized to zero. The "best" solution is the one which gives the lowest cost. Otherwise, the variable i is incremented.

If the condition on line 4 returns FALSE, the steps of lines 11-14 of Algorithm 3 are implemented. In line 12, the selection of a negative move from $\xi^-$ consists of the following steps.

1. Compute $\alpha_v = \dfrac{\sum_{(i,j)\in \xi^-} -|LUT(i, j) - LUT(i, \delta_i)|}{|\xi^-|}$ 2. Create a subset of $\xi^-$ as $\xi_s^- = $ $\{(i, j), \text{s.t. } |LUT(i, j) - LUT(i, \delta_i)| \leq \alpha_{1i}\}$ 3. Randomly select a move from $\xi_s^-$ In first step, the expression, LUT(i,j)−LUT(i, $\delta_i$), computes the difference between the cost of the current solution (i.e., the solution in which the frequency of the ith transmitter is $\delta_i$) and a modified version of the current solution in which the frequency of the ith transmitter is $f_j$. The $a_v$ variable in the archive stores the average value of the term

|LUT(i,j)−LUT(i, $\delta_i$)| of all moves (i,j)∈$\xi^-$. In the second step, a set $\xi_S^-$ is created that contains all moves of $\xi^-$ except the ones that increase the cost of the solution more than a certain value $\alpha_v$. In the third step, a move from $\xi_S^-$ is randomly selected and applied to the current solution.

After a positive or negative move is selected and applied, the next step updates the LUT. The LUT is updated after any change in the current solution (as mentioned in line 15 of Algorithm 3). When the frequency of a transmitter is changed, only a small portion of the LUT needs to be updated, not the entire table. When the frequency of a transmitter $v_i$ is changed, a partial update of the LUT proceeds as follows: (i) a set $R_i$ is built that contains all transmitters that have a separation constraint with $v_i$, i.e., $R_i=\{v_j,$ such that there is at least one $(v_i, v_j)\in E\}$; (ii) A subset of rows of the LUT is selected that corresponds to the transmitters present in $R_i$ (where the jth row of the LUT corresponds to the transmitter $v_j$); (3) The selected rows of the LUT are updated using equation (4) and (5).

Step 4: Update the Archive

The heuristic of the present disclosure employs an archive ($\alpha$) of $\gamma$ solutions. Until the archive is completely full, new solutions are added to the archive. However, when the archive becomes full, an existing solution must be replaced with a new solution. If the cost of the new solution is not better than any of the solutions already stored in the archive, then the new solution is ignored. Otherwise, a solution in the archive is first found whose cost is maximum in the archive and more than the new solution, and then is replaced with the new solution.

Step 5: Shifting

The local search heuristic terminates upon encountering $\beta$ number of successive non-improving iterations. However, the local heuristic can then be applied by making some changes in the current solution ($\Delta$). The changes aim to shift the search to a new location in the search space. The local search method has the termination criterion that it terminates if the number of successive iterations does not improve the cost of the solution.

Figure 3:
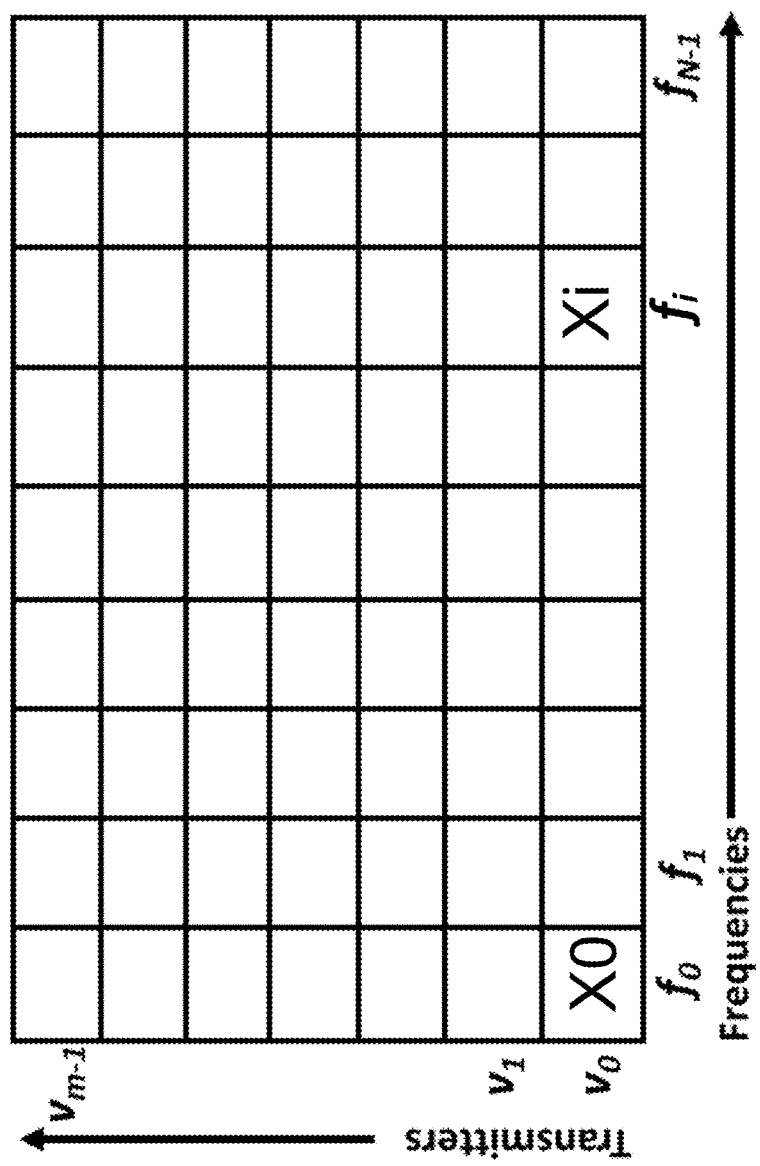
FIG. 3 illustrates a compound move in a neighborhood search space of an LUT.

After termination of the local search a compound move is applied, and then again the local search is conducted. A neighborhood search space for a compound move is shown in FIG. 3. The search for a frequency assignment for transmitter $v_0$ is shifted from $f_0$ to $f_i$. The solution using the penalties, constraints and probabilities of the new position $(v_0, f_i)$ is computed and the archive is updated as in Step 5.

A compound move is applied to shift the search to the new location. The compound move alters several elements of the solution. The following text describes the compound move.

1. Divide the transmitters of V into two distinct sets, $V_i$ and $V_n$, such that $V_i \cup V_n = V$ and $V_i \cap V_n =$ the null set. The set $V_i$ contains transmitters whose frequencies violate any one of the constraints and $V_n$ contains all the remaining transmitters. Mathematically, this can be expressed as, $V_i=\{v_x$ such that I $(v_x, v_y)>0$ or $I(v_y, v_x)>0\}$, where $v_x, v_y \in V$ and $V_n=V-V_i$.
3. Each transmitter in $V_i$ could change its assignment with a fixed probability $h_1$. The new frequency for the transmitter is determined randomly from the spectrum (F).
4. Each transmitter in $V_n$ could change its assignment with a fixed probability $h_2$. The new frequency for the transmitter is determined randomly from the spectrum (F). The value $h_2$ is usually much smaller than $h_1$.

Steps 6-7: The steps of applying the local search heuristic and shifting the search to new locations are repeated until the runtime of the heuristic reaches its maximum limit.

Figure 4:
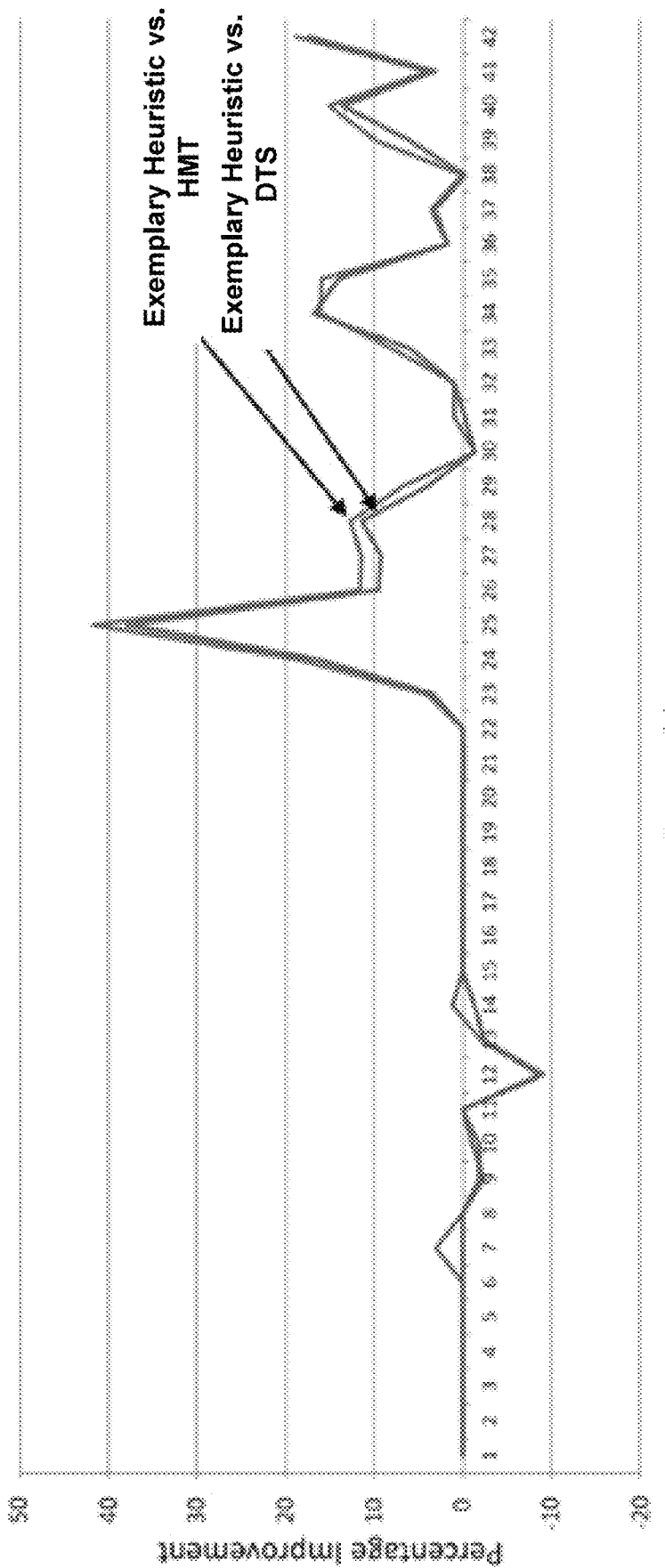
FIG. 4 is a graph illustrating the percentage improvement in solution quality in using the exemplary heuristic as compared to the existing heuristics.

A comparison of the exemplary heuristic to previous heuristic results is shown in FIG. 4.

Figure 5A:
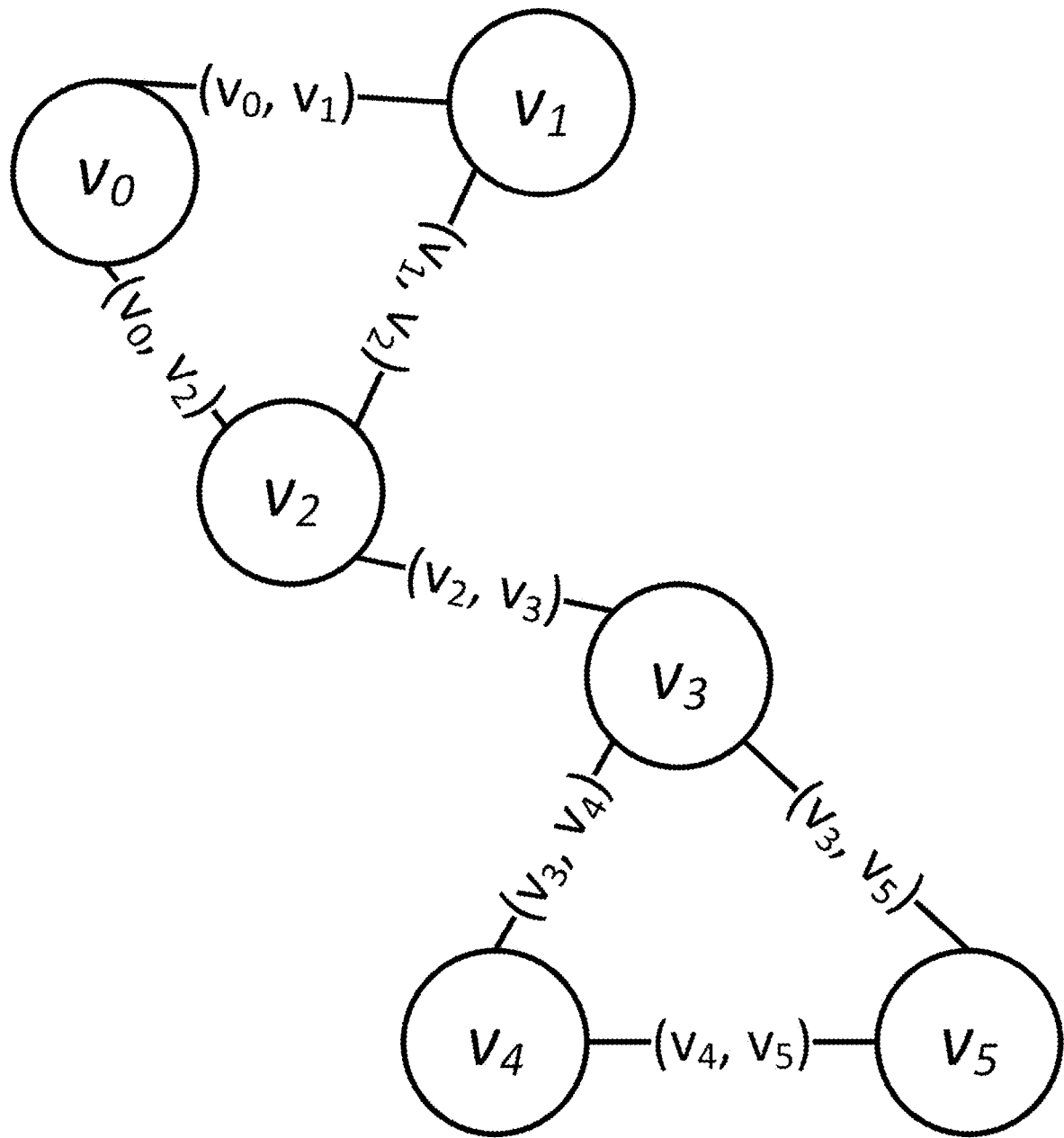
FIG. 5A is an example of frequency assignment for six transmitters.

FIG. 5A illustrates an example of using the search heuristic for a set of six transmitters (i.e., m=6) with vertices $\{v_0, v_1, v_2, v_3, v_4, v_5, v_6\}$. In a non-limiting example, the transmitters may be a set of surveillance sensors each separated by distances indicated by the lines between the transmitter vertices $v_i$. The distances in this example may range from 10 to 100 m, and the separation distance may depend on the range of each particular transmitter. For example, a first transmitter may have an effective aperture of 0.05 m and a transmission range of 20 m. A second transmitter may have an effective aperture of 0.07 m and a transmission range of 30 m. The edges are the physical extents of the transmitter apertures. The frequency spectrum available may be in the range of 35 to 40 GHz.

Edge $(v_1, v_1) \in V$ has two weights $d_{i,j}$ and $p_{i,j}$, where $d_{i,j}$ represents the minimum difference necessary between the frequencies (or channels) of transmitters $v_i$ and $v_j$, and $p_{i,j}$ denotes the penalty if the frequencies (or channels) of $v_i$ and $v_j$ is less than $d_{i,j}$. For simplicity, it is assumed that all values of $d_{i,j}$ are equal to two and all $p_{i,j}$ are equal to one in this example, where 0≤i≤m−1, and 0≤j≤m−1. The spectrum consists of finite number of discrete channels, and can be denoted using an ordered set as follows: $F=\{f_0, f_1, f_2, f_3\}$, where the spectrum size (N) is considered equal to three. The solution is represented by $\Delta=\{\delta_0, \delta_1, \delta_2, \delta_3, \delta_4, \delta_5\}$, where $\delta_1$ denotes the channel of transmitter $v_i$, for i=0 to 5.

In FIG. 5A, the weight $d_{0,2}$ indicates that the channels of transmitters $v_0$ and $v_2$ should be separated by at least $d_{0,2}$ units. The term $d_{0,2}$ is expressed in terms of its difference in the positions in the ordered set F. For example, when $d_{i,j}=1$, then $f_0$ cannot be assigned to $v_i$ and $f_1$ to $v_j$ ($\forall_i \neq j$) because $f_0$ and $f_1$ have consecutive positions in the spectrum F. However, $f_0$ can be assigned to $v_i$ and $f_2$ can be assigned to $v_j$ because the positions of $f_0$ and $f_2$ are more than one place apart from each other in the spectrum (F).

The contents of the LUT depend on the value of the solution $\Delta$. In the above example, when $\Delta=\{f_2, f_1, f_0, f_3, f_2, f_0\}$, the cost of the solution is 3 because the solution is violating up to three constraints: $(v_0, v_1), (v_1, v_2),$ and $(v_3, v_4)$. The contents of the LUT are shown in FIG. 5B.

In the LUT of FIG. 5B, the encircled values correspond to the frequencies used in the current solution. To illustrate the method used to compute a LUT value, the computation of the value at the position (0,0) in the LUT is shown. At position (0,0), it is assumed that the frequency of $v_0$ is $f_0$, and the frequencies of the remaining transmitters remain unchanged. The modified solution becomes equal to: $\{f_0, f_1, f_0, f_3, f_2, f_0\}$. Therefore, the value of this solution for transmitter $v_0$ violates two constraints: $(v_0, v_1)$ and $(v_0, v_2)$, each violation has a unit penalty, and consequently, the total interference due to transmitter v0 becomes equal to 2. The LUT shows that the first transmitter $v_0$ has one positive move available for it which is equal to $\xi(0)^+=\{(0, 5)\}$.

In the same problem, a solution can be reached whose value is equal to $\Delta=\{f_2, f_3, f_0, f_3, f_2, f_0\}$ with a cost equal to 2. The contents of the LUT at this point can be as shown in FIG. 5C. This LUT shows that all transmitters have been assigned to their best frequencies and there are no positive moves available in the LUT. All the moves available in the LUT are negative. The steps involved in a negative move are shown below:

1. Compute the average value $\alpha_v$ shown by the steps of lines 11-14 of Algorithm 3 as described above. In this example, the value of v is equal to 0.5.
2. Create the subset $\xi_s^-$ as shown in Equation 9.
3. Select a random move from the subset mentioned in the Step 2.

The local search operation terminates if it executes β number of times (iterations) without any improvement in the cost.

For example, if β=10, and a solution was found of a cost equaling 5 in the 10th iteration, the termination criterion states that local search, before reaching its 20th iteration, should find another solution of cost smaller than 5. Failure to do so results in the termination of the local search.

Figure 6:
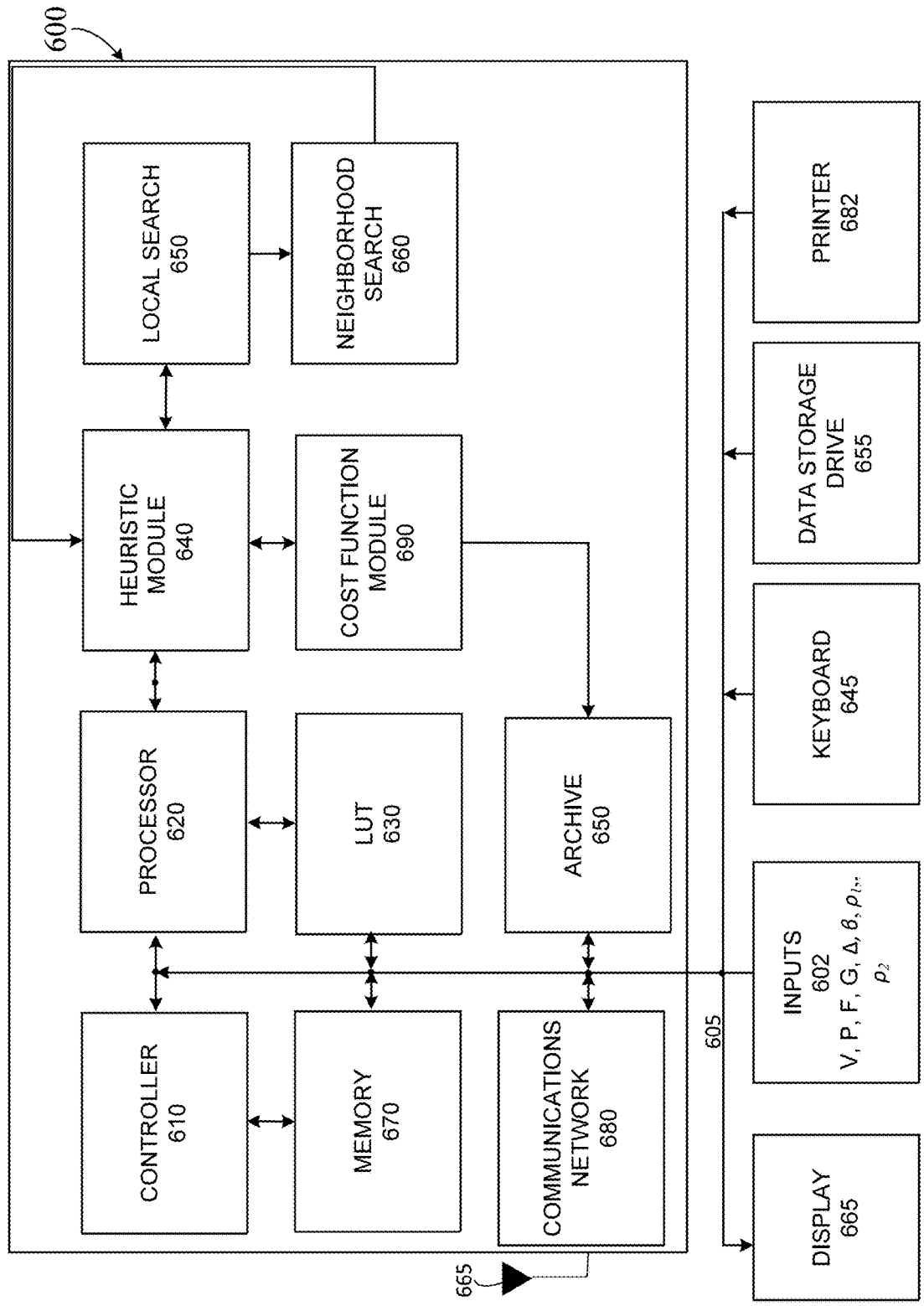
FIG. 6 depicts a computing environment which may be used to perform the frequency assignment.

FIG. 6 illustrates an exemplary computing system 600 for implementing the exemplary neighborhood search-based heuristic for assigning frequencies for transmitters in a fixed spectrum frequency assignment (FS-FA) telecommunications network. Computing system 600 is capable of executing the exemplary heuristic. A controller 610 receives the inputs necessary to execute the heuristic. The Inputs 602 are the set of transmitters V, the frequencies of the available spectrum F and the constraints P between each pair of transmitters. Additional inputs are a current solution (Δ), the graph G that models the problem, and parameters β, $\rho_1$, and $\rho_2$.

Exemplary computing system 600 is controlled primarily by computer readable instructions, which may be in the form of software, firmware, a combination of software and firmware, or the like. Such software may be executed within central processing unit (CPU), such as processor 620, to cause system 600 to perform the execution of the exemplary heuristic of the present invention. While computing system 600 may utilize a central processing unit 620 that is implemented by microelectronic chips in a general purpose, microprocessor configuration, system 600 may have a variety of computing machine architectures, such as programmable logic arrays (PLA), application specific integrated circuits (ASIC), field programmable gate arrays (FPGA), and the like. Moreover, computing environment 600 may use resources of remote CPUs through communications network 680 having antenna 665 or other data communications means.

In operation, CPU 620 fetches, decodes, and executes instructions, and transfers information to and from other resources via the computer's main data transfer path, system bus 605. The system bus 605 connects the components in computing system 600 and provides a data exchange medium. System bus 605 preferably includes data lines for data communication among/with attached devices, address lines for addressing attached devices, and control lines for polling, interrupting, controlling attached devices on the system bus 605.

Memory devices 670 coupled to system bus 605 may include random access memory (RAM) and read only memory (ROM), archive 650, LUT 630, or the like. Programmed instructions implementing the exemplary heuristic of the present invention may be stored and retrieved from memory 670, archive 650, LUT 630, or stored/retrieved to/from a combination of any of the storage devices.

ROMs generally contain stored data that cannot be modified. Alternatively, some of the data generated or used by the present invention could be stored in a ROM that is programmable for storage/retrieval of infrequently changing data.

Data stored in RAM can be read or changed by CPU 620 or other hardware devices. A memory controller may provide an address translation function that translates virtual addresses into physical addresses as instructions are executed and may also provide a memory protection function that isolates processes within the system and isolates system processes from user processes. Thus, a program running in a user mode can normally access only memory mapped by its own process virtual address space so that it cannot access memory within the virtual address space of another process, unless permission for memory sharing between the processes has been granted.

In addition, computing system 600 may contain peripheral controller 635 responsible for communicating instructions from controller 610 to peripherals, such as, printer 682, keyboard 645, mouse 665, and data storage device 655. Tangible results of processing according to the present invention may be stored in the data storage drive 655 and/or may be printed out on the printer 640. Moreover, programmed instructions implementing the exemplary heuristic may be stored, in whole or in part, within the data storage drive 655.

Display 665 is used to display visual output generated by computing system 600. Such visual output may include text, graphics, animated graphics, and video. Display 665 may be implemented with a CRT-based video display, an LCD-based flat panel display, a gas plasma-based flat panel display, a touch panel, or other display forms. The controller 610 may include a display controller which includes electronic components required to generate a video signal that is sent to display 665. It is within the contemplation of the present invention to provide tangible results of the heuristic via any combination of text, graphics, animated graphics, and video that can be presented on display 665.

Additionally, computing system 600 may contain network adaptor that can be used to connect computing system 600 to an external communication network, e.g., the Internet, an intranet, or the like. Communications network 680 may provide computer users with means of communicating and transferring software implementation and results of the exemplary heuristic electronically. Moreover, communications network 680 may provide distributed processing, which can involve a plurality of computing elements sharing the workload and cooperatively performing the exemplary heuristic. It will be appreciated that the network connections shown are exemplary, and other means of establishing a communications link between the computers may be used.

The processor 620 is connected to a heuristic module for performing a local search 650 including a one-change move and a neighborhood search 660 having a compound move. The local and neighborhood search results are sent back to the heuristic module, which is connected to the cost function module 690. The cost function module is connected to the archive 650 which stores a solution set of the assigned frequencies for each transmitter.

Exemplary computer system 600 is merely illustrative of a computing environment in which the inventive problem solving may operate and does not limit the implementation of the herein described exemplary heuristic in computing environments having differing components and configurations, as the inventive concepts described herein may be implemented in various computing environments having various components and configurations.

FIGS. 1-4, and 6 illustrate the first embodiment which describes a method for assigning frequencies in a fixed spectrum frequency assignment (FS-FA) telecommunications network having a plurality of wireless transmitters and at least one wireless receiver, in which the frequency assignment satisfies a set of frequency constraints.

The method includes receiving, by a computing system 600 configured for receiving, a fixed spectrum of frequencies F, a list of a plurality of transmitters V to be assigned frequencies, and a set of constraints P; dividing the plurality of transmitters into a first set of local transmitters and a second set of neighborhood transmitters, where the transmitters of the first set are different from the transmitters of the second set.

The computing system includes a processor 620 with program instructions configured for searching. The method includes the processor conducting a local search heuristic with a one-change move 650 within a search space of the first set; conducting by neighborhood search module 660, a compound move that shifts the local heuristic search to a new location in a neighborhood search space of the second set; repeating the local search heuristic and compound move in order to determine an assignment of frequencies for the transmitters which minimizes the total interference that may occur due to violation of the frequency constraints. After each move or a predefined set of moves, the heuristic module 640 sends the result set to cost function module 690 to compute the cost function of the move or set of moves before proceeding to the next iteration of the heuristic. A frequency is assigned to each transmitter of the plurality of transmitters which minimizes the total interference within the telecommunications network.

The method continues by wirelessly transmitting a first signal from a first transmitter at a first assigned frequency; receiving, by at least one wireless receiver, the signal from the first transmitter.

The step of conducting the local heuristic uses a lookup table (LUT) 630 to classify all possible one-change moves. The lookup table (LUT) comprises precomputed values of the possible increase/decrease in the interference when each transmitter changes its frequency. As shown in FIG. 2A, the lookup table (LUT) comprises a number of columns equal to the number of frequencies to be assigned and a number of rows equal to the number of transmitters, wherein the contents of the look-up table (LUT) are precomputed values of the possible increase/decrease in the interference when each transmitter changes its frequency.

One-change moves are one of positive moves and negative moves, wherein a positive move represents a decrease in interference and a negative move represents an increase in interference. After each move, the contents of the LUT 630 are updated based on the increase or decrease in interference.

A local cost function of the interference is computed by cost function module 690 after each move, wherein the cost function decreases after a positive move and is unchanged or increases after a negative move. A total cost function for the set of transmitter assignments is computed after all transmitters are updated, wherein the total cost function is minimized by the application of the heuristic. The local and total cost functions do not need to be calculated for every transmitter upon every iteration of the heuristic, only for those for which a positive or negative move was made.

The method continues by storing the frequency assignments in an archive 650, applying the heuristic iteratively; and updating the archive upon each iteration of the heuristic when there is at least one frequency assignment which provides a lower total cost function value.

The method of applying the heuristic comprises determining, by the local search heuristic 650, whether a positive move is available for the frequency of a transmitter; if the positive move is available, changing the frequency assigned to the transmitter by the amount of the positive move and updating the LUT 630 with the changed frequency; if a positive move is not available, calculating the difference between the cost function of the current frequency assignment and the cost function of the frequency assignment after a negative move; summing the differences and dividing by the absolute value of the negative move to determine the average value of the differences; generating a set of negative moves whose differences are less than the average value; randomly selecting a negative move from the set of negative moves; changing the frequency by the amount of the negative move; updating the LUT 630 with the frequency represented by the negative move; computing the total cost function; and updating the archive 650. The archive stores a frequency assignment solution set.

The second embodiment to a non-transitory computer readable medium having instructions stored therein that, when executed by one or more processor, cause the one or more processors to perform method for assigning frequencies in a fixed spectrum frequency assignment (FS-FA) telecommunications network having a plurality of wireless transmitters and at least one wireless receiver is described with respect to FIGS. 1-4, and 6.

The non-transitory computer readable medium method includes receiving, by a computing system 600 configured for receiving, a fixed spectrum of frequencies F, a list of a plurality of transmitters V to be assigned frequencies, and a set of constraints P; dividing the plurality of transmitters into a first set of local transmitters and a second set of neighborhood transmitters, where the transmitters of the first set are different from the transmitters of the second set.

The computing system includes a processor 620 with program instructions configured for searching. The non-transitory computer readable medium method includes the processor conducting a local search heuristic with a one-change move 650 within a search space of the first set; conducting by neighborhood search module 660, a compound move that shifts the local heuristic search to a new location in a neighborhood search space of the second set; repeating the local search heuristic and compound move in order to determine an assignment of frequencies for the transmitters which minimizes the total interference that may occur due to violation of the frequency constraints. After each move or a predefined set of moves, the heuristic module 640 sends the result set to cost function module 690 to compute the cost function of the move or set of moves before proceeding to the next iteration of the heuristic.

The non-transitory computer readable medium method continues by assigning a frequency to each transmitter of the plurality of transmitters, which minimizes the total interference within the telecommunications network. In use, the method includes wirelessly transmitting a first signal from a first transmitter at a first assigned frequency; receiving, by at least one wireless receiver, the signal from the first transmitter.

The step of conducting the local heuristic uses a lookup table (LUT) 630 to classify all possible one-change moves. The lookup table (LUT) comprises precomputed values of the possible increase/decrease in the interference when each transmitter changes its frequency. As shown in FIG. 2, the lookup table (LUT) comprises a number of columns equal to the number of frequencies to be assigned and a number of rows equal to the number of transmitters, wherein the contents of the look-up table (LUT) are precomputed values of the possible increase/decrease in the interference when each transmitter changes its frequency.

One-change moves are one of positive moves and negative moves, wherein a positive move represents a decrease in interference and a negative move represents an increase in interference. After each move, the contents of the LUT 630 are updated based on the increase or decrease in interference.

A local cost function of the interference is computed by cost function module 690 after each move, wherein the cost function decreases after a positive move and is unchanged or increases after a negative move. A total cost function for the set of transmitter assignments is computed after all transmitters are updated, wherein the total cost function is minimized by the application of the heuristic. The local and total cost functions do not need to be calculated for every transmitter upon every iteration of the heuristic, only for those for which a positive or negative move was made.

The non-transitory computer readable medium method continues by storing the frequency assignments in an archive 650, applying the heuristic iteratively; and updating the archive upon each iteration of the heuristic when there is at least one frequency assignment which provides a lower total cost function value.

The non-transitory computer readable medium method of applying the heuristic comprises determining, by the local search heuristic 650, whether a positive move is available for the frequency of a transmitter; if the positive move is available, changing the frequency assigned to the transmitter by the amount of the positive move and updating the LUT 630 with the changed frequency; if a positive move is not available, calculating the difference between the cost function of the current frequency assignment and the cost function of the frequency assignment after a negative move; summing the differences and dividing by the absolute value of the negative move to determine the average value of the differences; generating a set of negative moves whose differences are less than the average value; randomly selecting a negative move from the set of negative moves; changing the frequency by the amount of the negative move; updating the LUT 630 with the frequency represented by the negative move; computing the total cost function; and updating the archive 650. The archive stores a frequency assignment solution set.

Experimental results and their analysis are now described. The exemplary heuristic was implemented using C++ and R using an Rcpp package. Rcpp provides C++ classes to facilitate manipulation of a large number of R data structures, such as vectors and functions. (See "Rcpp-package" 2005-2009. Eddelbuettel, D; Francois, R., https://cran.r-project.org/web/packages/Rcpp/Rcpp.pdf, incorporated herein by reference in its entirety).

R is a language and environment for statistical computing and graphics. R provides a wide variety of statistical (linear and nonlinear modelling, classical statistical tests, time-series analysis, classification, clustering and graphical techniques.

C++ language was used to implement the local search heuristic and the R language was used to implement the operations to maintain the archive and shift the search to new locations. The program executed on a computer having Intel Xeon 2.8 GHz processor and 64 GB of memory.

The benchmarks used in the evaluation are the same as those commonly used in the field. Table 1 lists the main characteristics of the benchmarks. The first column mentions the name of the problem; the second gives the number of transmitters; the third column mentions the number of constraints; the fourth column mentions the average of the separation requirements in the constraints, and the last column mentions the average of the penalty values of the constraints. A total of forty-two test cases were executed in which each problem was solved several times, each with a different spectrum size.

A description of the selection of the parameter values is mentioned below. In the three problems that have $\rho > 1 \times 10^6$ (i.e., GSM2-184, GSM2-227, GSM2-272), the value of $\beta$ was set equal to 2000, and the value of $\gamma$ equal to 100. In the remaining problems, the value of $\beta$ was set equal to $1 \times 10^5$ and the value of $\gamma$ equal to 20. The values of the remaining two parameters ($\rho_1$ and $\rho_2$) are the same in all of the problems. The value of $\rho_1$ was set equal to 0.05 and the value of $\rho_2$ equal to 0.02. The parameter beta controls the termination of the local search heuristic.

TABLE 1

Characteristics of test problems

| Problem | \|V\| | \|E\| | $\hat{d}$ | $\hat{p}$ |
|---|---|---|---|---|
| AC-45-17 | 45 | 482 | 0.29 | 1.00 |
| AC-45-25 | 45 | 801 | 0.34 | 1.00 |
| AC-95-9 | 95 | 781 | 0.00 | 1.00 |
| AC-95-17 | 95 | 2298 | 0.15 | 1.00 |
| GSM-93 | 93 | 1073 | 0.28 | 1.00 |
| GSM-246 | 246 | 7611 | 0.32 | 1.00 |
| Test95 | 95 | 1214 | 1.37 | 1.00 |
| Test282 | 282 | 10,430 | 1.38 | 1.00 |
| P06-5 | 88 | 3021 | 0.39 | 1.00 |
| P06-3 | 153 | 9193 | 0.59 | 1.00 |
| P06b-5 | 88 | 3021 | 0.39 | 1.00 |
| P06b-3 | 153 | 9193 | 0.40 | 1.00 |
| GSM2-184 | 184 | 6809 | 0.20 | $8.95 \times 10^6$ |
| GSM2-227 | 227 | 10,088 | 0.18 | $9.10 \times 10^6$ |
| GSM2-272 | 272 | 14,525 | 0.16 | $7.95 \times 10^6$ |
| 1-1-50-75-30-2-50 | 75 | 835 | 0.26 | 10.81 |
| 1-2-50-75-30-4-50 | 75 | 835 | 0.62 | 11.01 |
| 1-3-50-75-30-0-50 | 75 | 835 | 0.00 | 10.97 |
| 1-4-50-75-30-2-1 | 75 | 835 | 0.25 | 1.00 |
| 1-5-50-75-30-2-100 | 75 | 835 | 0.26 | 21.35 |
| 1-6-50-75-30-0-10000 | 75 | 835 | 0.00 | 2068.48 |

As a result of the experiments, it was found that in large problems, if the local search heuristic could not improve the solution in up to 50,000 iterations, then it could not improve the solution. In smaller problems, the local search traps into a local minimum within few thousand iterations. The parameter gamma controls the archive size, and an increase in its size increases the runtime of the heuristic. Therefore, it should be set to the smallest value that yields good results. A detailed investigation of the parameters values is outside the scope of this work. The parameters $h_1$ and $h_2$ are mutation probabilities; therefore, their values should be kept small.

Three of the problems (GSM2-184, GSM2-227, GSM2-272) have a relatively smaller value $\beta$ of because in those problems the penalties are small for some constraints and very large for others. In the local search heuristic, negative moves are filtered out that cause a large increase in the cost of the solution which eliminates the moves that have large penalty values. This elimination of some possible moves may lead the heuristic to quickly trap into a local minimum. Therefore, the trapping of the search into a local minimum can be detected by using fewer successive non-improving iterations. Empirical results verified this observation and an improvement in runtime was noticed when setting the parameter $\beta$ to a smaller value (2,000 to 10,000) in the GSM2-184, GSM2-227, and GSM2-272 problems.

The compound move employed the parameters $h_1$ and $h_2$ and treated them as mutation probabilities. Therefore, these values should be small (0.05 and 0.02). The effect of the non-deterministic behavior of the exemplary heuristic was determined by conducting twenty trials on each problem. The stopping criterion of the exemplary heuristic used in the experiments was as follows: If the last 1000 iterations could not produce any improvement in the cost of the solution, then the heuristic should terminate. The FS-FA problem is an offline problem. Therefore, the runtime is not critical as long as it remains within practical limits. The maximum runtime was set to solve any problem within 2 hours. However, most of the problems converged to their best solutions within the first 30 minutes.

The exemplary heuristic of the present disclosure was compared with two existing single-solution-based heuristics, which are the dynamic list tabu search (DTS) algorithm and the heuristic manipulation technique-based tabu search (HMT) algorithm. The DTS and HMT belong to the class of single-solution memory-based local search heuristics. The previous works using the HMT and DTS heuristics conducted ten trials, with the maximum runtime set to 45 minutes. However, it was mentioned that any increase in the runtime was not likely to improve the solution quality.

Table 2 shows the results of the exemplary heuristic of the present disclosure and that of the DTS and HMT. The results of each heuristic consist of two columns. The first column mentions the average values (mean) of the trials, and the second column mentions the best and the worst results of the trials. The results show that the exemplary heuristic obtained results which were equal to or better than HMT and DTS in many problems. In FIG. 4, the results of Table 2 are summarized to show the improvement of the exemplary heuristic over HMT and DTS. In FIG. 4, they-axis shows the percentage with which the solution of the exemplary heuristic is better than that of the HMT and DTS heuristics. The numbers on the x-axis correspond to different problems in the same order as in Table 2.

The results reveal the following about the comparison of the solution quality of the exemplary heuristic with HMT and DTS on 42 test problems: the solution quality of the exemplary heuristic is better than that of HMT and DTS in 21 and 17 problems, respectively. The exemplary heuristic has a solution quality equal to that given by HMT and DTS heuristics in 16 problems. The solution quality of the exemplary heuristic is also worse than that of HMT and DTS in up to 5 and 9 problems, respectively. In the problems in which the exemplary heuristic performed better than the existing heuristics, the solution quality is up to 41% better than that of HMT and 38% better than that of DTS. In the problems in which the exemplary heuristic performed worse than the existing heuristics, the solution quality is up to −9% less than that of HMT and DTS.

TABLE 2

Comparison with existing single-solution and memory-based optimization heuristics

| | | Exemplary Heuristic | | HMT | | DTS | |
|---|---|---|---|---|---|---|---|
| Problem | \|F\| | Mean | (best, worst) | Mean | (best, worst) | Mean | (best, worst) |
| AC-45-17 | 7 | 32.00 | (32, 32) | 32.00 | (32, 32) | 32.00 | (32, 32) |
| AC-45-17 | 9 | 15.00 | (15, 15) | 15.00 | (15, 15) | 15.00 | (15, 15) |
| AC-45-25 | 11 | 33.00 | (33, 33) | 33.00 | (33, 33) | 33.00 | (33, 33) |
| AC-95-9 | 6 | 31.00 | (31, 31) | 31.00 | (31, 31) | 31.00 | (31, 31) |
| AC-95-17 | 15 | 33.26 | (33, 34) | 33.00* | (33, 33) | 33.00* | (33, 33) |
| AC-95-17 | 21 | 10.00 | (10, 10) | 10.00 | (10, 10) | 10.00 | (10, 10) |
| GSM-93 | 9 | 32.00* | (32, 32) | 33.00 | (32, 34) | 32.20 | (32, 33) |
| GSM-93 | 13 | 7.00 | (7, 7) | 7.00 | (7, 7) | 7.00 | (7, 7) |
| GSM-246 | 21 | 82.10 | (80, 83) | 80.20* | (79, 81) | 80.60 | (79, 82) |
| GSM-246 | 31 | 26.58 | (25, 27) | 26.30 | (25, 27) | 26.10* | (25, 27) |
| Test95 | 36 | 8.00 | (8, 8) | 8.00 | (8, 8) | 8.00 | (8, 8) |
| Test282 | 61 | 58.05 | (55, 59) | 53.40 | (51, 56) | 53.20* | (51, 55) |
| Test282 | 71 | 30.00 | (29, 31) | 29.40 | (27, 30) | 29.30* | (27, 30) |
| Test282 | 81 | 12.06 | (10, 14) | 12.20 | (11, 13) | 11.90* | (10, 13) |
| P06-5 | 11 | 133.00 | (133, 133) | 133.00 | (133, 133) | 133.00 | (133, 133) |
| P06-3 | 31 | 115.00 | (115, 115) | 115.00 | (115, 115) | 115.00 | (115, 115) |
| P06b-5 | 21 | 52.00 | (52, 52) | 52.00 | (52, 52) | 52.00 | (52, 52) |
| P06b-5 | 31 | 25.00 | (25, 25) | 25.00 | (25, 25) | 25.00 | (25, 25) |
| P06b-3 | 31 | 112.00 | (112, 112) | 112.00 | (112, 112) | 112.00 | (112, 112) |
| P06b-3 | 31 | 26.00 | (26, 26) | 26.00 | (26, 26) | 26.00 | (26, 26) |
| 1-4-50-75-30-2-1 | 6 | 71.00 | (71, 71) | 71.00 | (71, 71) | 70.90* | (70, 71) |
| 1-4-50-75-30-2-1 | 10 | 19.00 | (19, 19) | 19.00 | (19, 19) | 19.00 | (19, 19) |
| GSM2-184 | 39 | 5414.57* | (5322, 5571) | 5642.80 | (5481, 5758) | 5598.80 | (5447, 5689) |
| GSM2-184 | 49 | 874.00* | (874, 874) | 1073.40 | (999, 1143) | 1043.60 | (874, 1120) |
| GSM2-184 | 52 | 162.00* | (162, 162) | 277.90 | (186, 311) | 260.60 | (162, 287) |
| GSM2-227 | 29 | 60,186.63* | (58,542, 62,734) | 68,077.70 | (61,586, 70,105) | 66,510.00 | (61,586, 70,105) |
| GSM2-227 | 39 | 9890.86* | (9529, 10,493) | 11,170.30 | (10,979, 11,276) | 10,897.70 | (10,550, 11,164) |
| GSM2-227 | 49 | 2315.06* | (2170, 2559) | 2649.10 | (2459, 2828) | 2613.10 | (2459, 2828) |
| GSM2-272 | 34 | 56,336.68* | (53,962, 59,069) | 60,473.20 | (57,715, 67,025) | 58,691.40 | (56,128, 64,353) |
| GSM2-272 | 49 | 7967.95 | (7909, 8796) | 8043.80 | (7785, 8411) | 7946.70* | (7785, 8459) |
| 1-1-50-75-30-2-50 | 5 | 1242.00* | (1242, 1242) | 1254.10 | (1242, 1260) | 1253.90 | (1242, 1260) |
| 1-1-50-75-30-2-50 | 10 | 96.80* | (96, 97) | 105.30 | (101, 109) | 103.80 | (97, 109) |
| 1-1-50-75-30-2-50 | 11 | 55.00* | (55, 55) | 65.50 | (59, 69) | 66.10 | (59, 70) |
| 1-1-50-75-30-2-50 | 12 | 33.31* | (32, 36) | 39.60 | (38, 42) | 38.70 | (36, 42) |
| 1-2-50-75-30-4-50 | 9 | 669.90* | (665, 680) | 680.90 | (671, 691) | 680.60 | (671, 691) |
| 1-2-50-75-30-4-50 | 11 | 315.00* | (313, 318) | 315.00* | (313, 318) | 325.00 | (317, 335) |
| 1-2-50-75-30-0-50 | 7 | 197.00 | (194, 198) | 197.10 | (196, 198) | 196.50* | (194, 199) |
| 1-5-50-75-30-2-100 | 10 | 172.70* | (168, 179) | 191.60 | (186, 197) | 183.80 | (176, 199) |
| 1-5-50-75-30-2-100 | 12 | 59.90* | (58, 63) | 70.50 | (65, 74) | 69.30 | (63, 74) |
| 1-6-50-75-30-0-100000 | 10 | 6842.00* | (677, 7187) | 7123.40 | (6942, 7279) | 7064.30 | (6840, 7267) |
| 1-6-50-75-30-0-100000 | 13 | 1128.15* | (1190, 1309) | 1389.60 | (1207, 1490) | 1365.20 | (1318, 1440) |

Table 3 lists the problems in which the worst result of all trials of the exemplary heuristic is better than the best result of the other heuristics. Under this condition, the exemplary heuristic has a solution quality which is better than that of HMT or DTS heuristic in all trials. Therefore, the exemplary heuristic has a clear advantage over the other heuristic (DTS or HMT). As Table 3 shows, the results of all trials of the exemplary heuristic are better than the results of all trials of HMT in up to eight problems and better than the results of all trials of DTS in up to three problems.

TABLE 3

Nine experimental results in which all trials of the exemplary heuristic give better results than those of the HMT and DTS heuristics

| Problem | |F| | Proposed (worst) | HMT (best) | DTS (best) |
|---|---|---|---|---|
| GSM2-184 | 49 | 874° | 999 | — |
| GSM2-184 | 52 | 162° | 186 | — |
| GSM2-227 | 39 | 10,493° | 10,979 | 10,550 |
| 1-1-50-75-30-2-50 | 10 | 97° | 101 | — |
| 1-1-50-75-30-2-50 | 11 | 55° | 59 | 59 |
| 1-1-50-75-30-2-50 | 12 | 36° | 38 | |
| 1-5-50-75-30-2-100 | 10 | 179° | 186 | |
| 1-5-50-75-30-2-100 | 12 | 63° | 65 | |
| 1-6-50-75-30-0-10000 | 13 | 1309° | — | 1318 |

The exemplary heuristic was compared with a TS heuristic which employs a dynamic length tabu list (DL-TS heuristic). The source code of the DL-TS heuristic was downloaded from its author's website. The DL-TS heuristic was executed with default parameters on the same platform as the heuristic of the present disclosure. Up to twenty trials were conducted on each problem. Wilcoxon signed tests were used to compare the results of the proposed and DL-TS heuristics. The DL-TS heuristic is a TS heuristic for the FA problem, and the comparison results show the superiority of the exemplary heuristic over an exclusive application of TS heuristic. The Wilcoxon test is among the methods recommended by experts to compare two heuristics. (See Derrac, J.; García, S.; Molina, D.; Herrera, F.: "A practical tutorial on the use of nonparametric statistical tests as a methodology for comparing evolutionary and swarm intelligence algorithms". Swarm Evol. Comput. 1(1), 3-18 (2011). https://doi.org/10.1016/j.swevo. 2011.02.002, incorporated herein by reference in its entirety). Table 4 shows the results of the Wilcoxon signed tests. In Table 4, the first two columns specify the problem and frequency respectively. The third and fourth columns specify the mean values of the objective function. The fifth column specifies the $\rho$ values of the Wilcoxon tests. The last column states the conclusion about the comparison using the $\rho$ value. When the $\rho$ value is greater than or equal to $\alpha=0.01$, the two heuristics are considered to be equal in performance. When the $\rho$ value is smaller than $\alpha=0.01$, then the heuristic that has a smaller mean dominates the other heuristic. The results indicate that in eleven problems the results of the proposed and DL-TS heuristics are equal and in thirty problems the exemplary heuristic performs better than the DL-TS heuristic. The Wilcoxon test cannot be applied when all trials produced the same result. In those problems, the results are compared without any statistical tests.

TABLE 4

Results of Wilcoxon signed-rank tests

| Problem | |F| | Mean value | Exemplary TS | p value | Remarks |
|---|---|---|---|---|---|
| AC-45-17 | 7 | 32.00 | 32.00 | — | Equal |
| AC-45-17 | 9 | 15.00 | 15.15 | 0.22 | Equal |
| AC-45-25 | 11 | 33.00 | 33.00 | — | Equal |
| AC-95-9 | 6 | 31.00 | 31.00 | — | Equal |
| AC-95-17 | 15 | 33.26 | 34.00 | 0.0472 | Equal |
| AC-95-17 | 21 | 10.00 | 10.00 | — | Equal |
| GSM-93 | 9 | 32.00 | 34.15 | 0.0103 | Equal |
| GSM-93 | 13 | 7.00 | 8.25 | 7.57e−06 | Better |
| GSM-246 | 21 | 82.10 | 95.45 | 1.08e−05 | Better |
| GSM-246 | 31 | 26.58 | 35.35 | 1.03e−05 | Better |
| Test95 | 36 | 8.00 | 9.70 | 4.85e−06 | Better |
| Test282 | 61 | 58.05 | 73.50 | 1.09e−05 | Better |
| Test282 | 71 | 30.00 | 45.70 | 1.02e−05 | Better |
| Test282 | 81 | 12.06 | 23.50 | 9.9e−06 | Better |
| P06-5 | 11 | 133.00 | 150.75 | 7.98e−06 | Better |
| P06-3 | 31 | 115.00 | 137.75 | 7.83e−06 | Better |
| P06b-5 | 21 | 52.00 | 55.75 | 4.47e−05 | Better |
| P06b-5 | 31 | 25.00 | 27.80 | 4.15e−05 | Better |
| P06b-3 | 31 | 112.00 | 125.15 | 7.96e−06 | Better |
| P06b-3 | 71 | 26.00 | 32.00 | 7.49e−06 | Better |
| 1-4-50-75-30-2-1 | 6 | 71.00 | 70.65 | 0.0324 | Equal |
| 1-4-50-75-30-2-1 | 10 | 19.00 | 19.10 | 0.334 | Equal |
| GSM2-184 | 39 | 5414.57 | 6475.70 | 1.2e−05 | Better |
| GSM2-184 | 49 | 874.00 | 1052.95 | 4.2e−05 | Better |
| GSM2-184 | 52 | 167.00 | 292.25 | 0.000826 | Better |
| GSM2-227 | 29 | 60,186.63 | 218,430.05 | 6.66e−08 | Better |
| GSM2-227 | 39 | 9890.86 | 15,990.05 | 6.66e−08 | Better |
| GSM2-227 | 49 | 2315.06 | 3537.75 | 6.66e−08 | Better |
| GSM2-272 | 34 | 56,336.68 | 111,740.95 | 6.66e−08 | Better |
| GSM2-272 | 39 | 28,878.50 | 43,536.45 | 6.66e−08 | Better |
| GSM2-272 | 49 | 7967.95 | 13,177.10 | 6.66e−08 | Better |
| 1-1-50-75-30-2-50 | 5 | 1242.00 | 1243.20 | 0.0255 | Equal |
| 1-1-50-75-30-2-50 | 10 | 96.80 | 104.80 | 4.67e−05 | Better |
| 1-1-50-75-30-2-50 | 11 | 55.00 | 67.05 | 7.79e−06 | Better |
| 1-1-50-75-30-2-50 | 12 | 33.31 | 40.75 | 1.07e−05 | Better |

TABLE 4-continued

Results of Wilcoxon signed-rank tests

| Problem | |F| | Mean value | Exemplary TS | p value | Remarks |
|---|---|---|---|---|---|
| 1-5-50-75-30-4-50 | 9 | 669.00 | 685.95 | 0.000224 | Better |
| 1-2-50-75-30-4-50 | 11 | 315.00 | 338.45 | 1.03e−05 | Better |
| 1-3-50-75-30-0-50 | 7 | 197.00 | 198.05 | 0.0274 | Equal |
| 1-5-50-75-30-2-100 | 19 | 172.70 | 189.55 | 5.59e−05 | Better |
| 1-5-50-75-30-2-100 | 12 | 59.90 | 71.00 | 1.09e−05 | Better |
| 1-6-50-75-30-0-10000 | 10 | 6842.00 | 7159.65 | 1.12e−05 | Better |
| 1-6-50-75-30-0-10000 | 13 | 1128.15 | 1454.05 | 1.4e−05 | Better |

The present disclosure describes an exemplary heuristic for the minimization of interference in the FS-FA problem. The heuristic has two main components: a local search heuristic, and a compound-move operation. The local search heuristic employs a LUT. Each entry in the LUT is a possible move and stores the value by which it can increase or decrease the interference of the solution. For example, the value at location (i,j) in the LUT stores the increase/decrease in the interference, if the transmitter $v_i \in V$ chooses the frequency $f_i \in F$. Moves in the LUT are classified as positive or negative. Using the heuristic, a positive move is first attempted. However, if a positive move is not found, then a negative move is chosen that can increase the interference by an amount which is less than the average increase in all negative moves. The local search is considered to be trapped in a local minimum if many successive iterations show no improvement in the cost. The compound move shifts the search to a new location in the search space and prevents the search from getting trapped into any local minimum. Experiments demonstrate that the exemplary heuristic is competitive with existing single-solution-based heuristics such as HMT and DTS heuristics. The experiments used the same benchmarks as used by other recent heuristics for comparison. The solution quality of the exemplary heuristic is better than or equal to that of HMT in 88% test problems, and better than or equal to that of DTS in 79% test problems. In some problems, the worst result of any trial of the exemplary heuristic is better than the best reported result of the HMT and DTS heuristics. Future work will strive to further enhance the heuristic to solve the frequency assignment problem in a dynamic setting.

Figure 7:
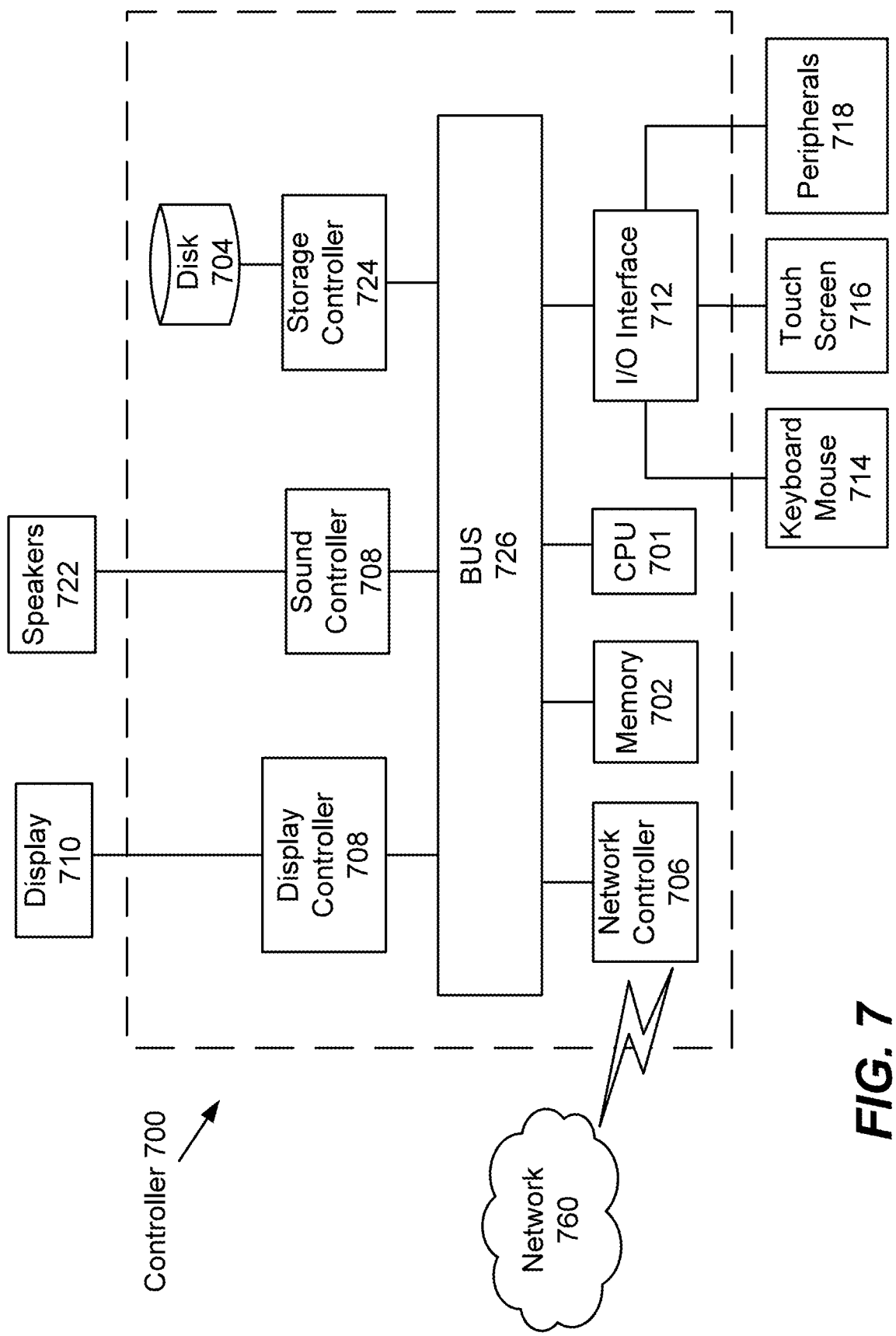
FIG. 7 is a non-limiting example of computing hardware which may be used in the controllers of the exemplary embodiments.

Next, further details of the hardware description of the controllers of FIG. 6 according to exemplary embodiments is described with reference to FIG. 7. In FIG. 7, a controller 700 is described is representative of controller 610 of FIG. 6 in which the controller is a computing device which includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed advancements may be provided as a utility application, background daemon, or component of an operating system, or combination thereof, executing in conjunction with CPU 701 and an operating system such as Microsoft Windows 7, UNIT, Solaris, LINU7, Apple MAC-OS and other systems known to those skilled in the art.

The hardware elements in order to achieve the computing device may be realized by various circuitry elements, known to those skilled in the art. For example, CPU 701 may be a Xenon or Core processor from Intel of America or an Opteron processor from AMD of America, or may be other processor types that would be recognized by one of ordinary skill in the art. Alternatively, the CPU 701 may be implemented on an FPGA, ASIC, PLD or using discrete logic circuits, as one of ordinary skill in the art would recognize. Further, CPU 701 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN subnetworks. The network 760 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GT7 or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster 7-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
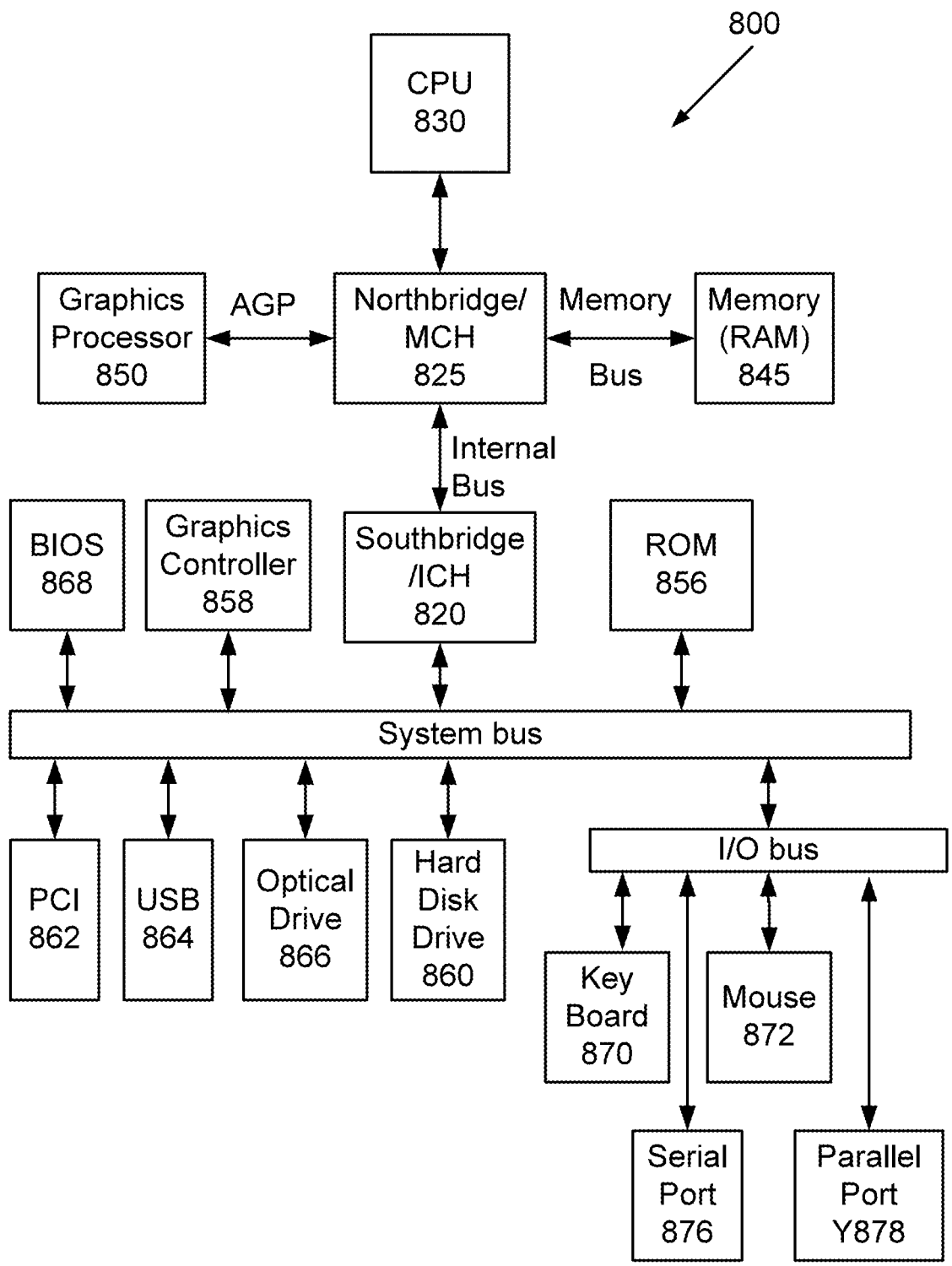
FIG. 8 is a non-limiting example of a diagram of a data processing system which may be used within the controllers, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
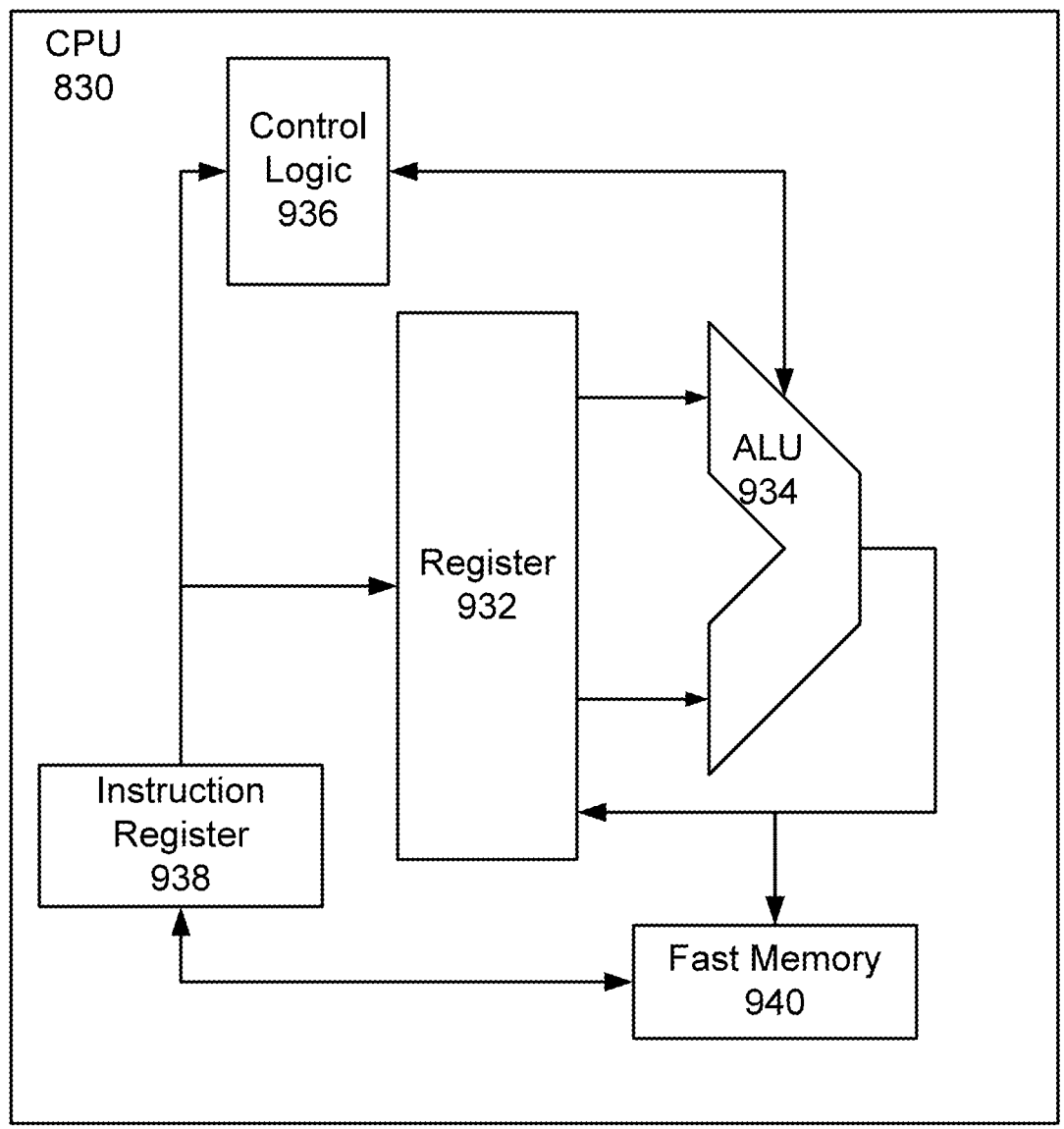
FIG. 9 is a non-limiting example of a schematic diagram of a CPU which may be used in the controllers according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
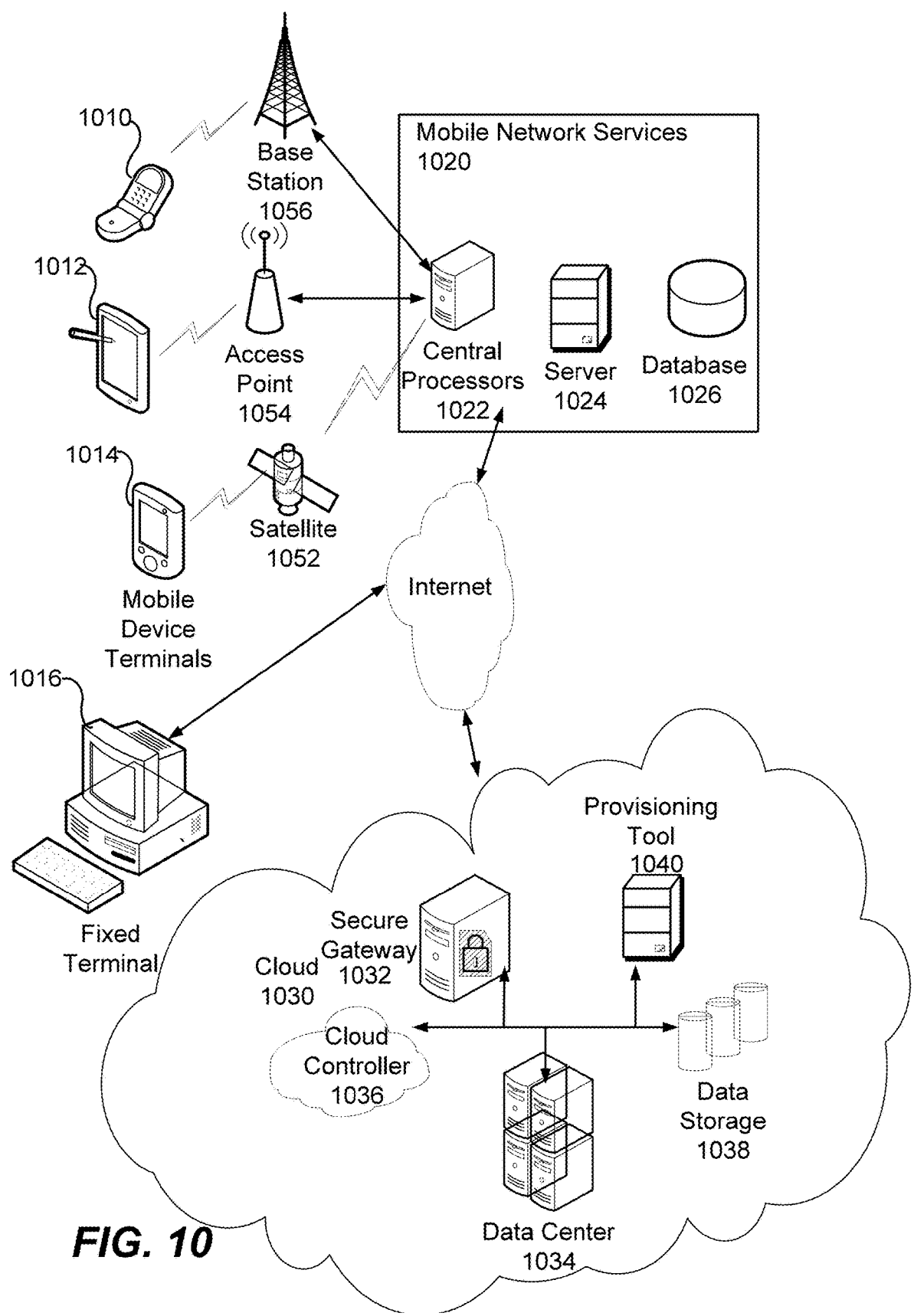
FIG. 10 is an illustration of a non-limiting example of distributed components which may share processing with the controllers, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for assigning frequencies in a fixed spectrum frequency assignment (FS-FA) telecommunications network having a plurality of wireless transmitters and at least one wireless receiver, comprising:
   receiving, by a computing system configured for receiving, a fixed spectrum of frequencies, a list of a plurality of transmitters to be assigned frequencies, and a set of constraints;
   dividing the plurality of transmitters into a first set of local transmitters and a second set of neighborhood transmitters, where the transmitters of the first set are different from the transmitters of the second set;
   conducting, by a computing system having a processor with program instructions configured for searching, a local search heuristic with a one-change move within a search space of the first set;
   conducting a compound move that shifts the local heuristic search to a new location in a neighborhood search space of the second set;
   repeating the local search heuristic and compound move in order to determine an assignment of frequencies for the transmitters which minimizes the total interference that may occur due to violation of the frequency constraints;

assigning a frequency to each transmitter of the plurality of transmitters which minimizes the total interference within the telecommunications network;

using a lookup table (LUT) to classify all possible one-change moves, wherein the lookup table (LUT) comprises a number of columns equal to the number of frequencies to be assigned and a number of rows equal to the number of transmitters, wherein the contents of the look-up table (LUT) are precomputed values of the possible increase/decrease in the interference when each transmitter changes its frequency and wherein the one-change moves are one of positive moves and negative moves, wherein a positive move represents a decrease in interference and a negative move represents an increase in interference;

updating the contents of the LUT a based on the increase or decrease in interference;

computing a local cost function of the interference after each move, wherein the cost function decreases after a positive move and is unchanged or increases after a negative move;

computing a total cost function for the set of transmitter assignments, wherein the total cost function is minimized by the application of the heuristic;

storing the frequency assignments in an archive, applying the heuristic iteratively;

updating the archive upon each iteration of the heuristic when there is at least one frequency assignment which provides a lower total cost function value;

determining, by the local search heuristic, whether a positive move is available for the frequency of a transmitter;

if the positive move is available, changing the frequency assigned to the transmitter by the amount of the positive move and updating the LUT with the changed frequency;

if a positive move is not available, calculating the difference between the cost function of the current frequency assignment and the cost function of the frequency assignment after a negative move;

summing the differences and dividing by the absolute value of the negative move to determine the average value of the differences;

generating a set of negative moves whose differences are less than the average value;

randomly selecting a negative move from the set of negative moves:

changing the frequency by the amount of the negative move;

updating the LUT with the frequency represented by the negative move;

computing the total cost function; and updating the archive.

2. The method of claim 1, wirelessly transmitting a first signal from a first transmitter at a first assigned frequency;

receiving, by at least one wireless receiver, the signal from the first transmitter.

3. A non-transitory computer readable medium having instructions stored therein that, when executed by one or more processors, cause the one or more processors to perform a method for assigning frequencies in a fixed spectrum frequency assignment (FS-FA) telecommunications network having a plurality of wireless transmitters and at least one wireless receiver comprising:

receiving, by a computing system configured for receiving, a fixed spectrum of frequencies, a list of a plurality of transmitters to be assigned frequencies, and a set of constraints;

dividing the plurality of transmitters into a first set of local transmitters and a second set of neighborhood transmitters, where the transmitters of the first set are different from the transmitters of the second set;

conducting, by a computing system having a processor with program instructions configured for searching, a local search heuristic with a one-change move within a search space of the first set;

conducting a compound move that shifts the local heuristic search to a new location in a neighborhood search space of the second set;

repeating the local search heuristic and compound move in order to determine an assignment of frequencies for the transmitters which minimizes the total interference that may occur due to violation of the frequency constraints;

assigning a frequency to each transmitter of the plurality of transmitters which minimizes the total interference within the telecommunications network;

using a lookup table (LUT) to classify all possible one-change moves, wherein the lookup table (LUT) comprises a number of columns equal to the number of frequencies to be assigned and a number of rows equal to the number of transmitters, wherein the contents of the look-up table (LUT) are precomputed values of the possible increase/decrease in the interference when each transmitter changes its frequency and wherein the one-change moves are one of positive moves and negative moves, wherein a positive move represents a decrease in interference and a negative move represents an increase in interference;

updating the contents of the LUT a based on the increase or decrease in interference;

computing a local cost function of the interference after each move, wherein the cost function decreases after a positive move and is unchanged or increases after a negative move;

computing a total cost function for the set of transmitter assignments, wherein the total cost function is minimized by the application of the heuristic;

storing the frequency assignments in an archive;

applying the heuristic iteratively;

updating the archive upon each iteration of the heuristic when there is at least one frequency assignment which provides a lower total cost function value;

determining, by the local search heuristic, whether a positive move is available for the frequency of a transmitter;

if the positive move is available, changing the frequency assigned to the transmitter by the amount of the positive move and updating the LUT with the changed frequency;

if a positive move is not available, calculating the difference between the cost function of the current frequency assignment and the cost function of the frequency assignment after a negative move;

summing the differences and dividing by the absolute value of the negative move to determine the average value of the differences;

generating a set of negative moves whose differences are less than the average value;

randomly selecting a negative move from the set of negative moves;

changing the frequency by the amount of the negative move;

updating the LUT with the frequency represented by the negative move; computing the total cost function; and updating the archive.

4. The non-transitory computer readable medium of claim 3, further comprising wirelessly transmitting a first signal from a first transmitter at a first assigned frequency;

receiving, by at least one wireless receiver, the signal from the first transmitter.

* * * * *